(12) United States Patent
Hirata et al.

(10) Patent No.: US 12,166,396 B2
(45) Date of Patent: Dec. 10, 2024

(54) VIBRATION MOTOR WITH BEARING PORTION AND AIR PASSAGE AND AIR HOLE

(71) Applicant: NIDEC CORPORATION, Kyoto (JP)

(72) Inventors: Atsunori Hirata, Kyoto (JP); Ryoichi Mitsuhata, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 18/317,088

(22) Filed: May 14, 2023

(65) Prior Publication Data

US 2023/0283155 A1 Sep. 7, 2023

Related U.S. Application Data

(63) Continuation of application No. 17/369,977, filed on Jul. 8, 2021, now Pat. No. 11,699,943.

(30) Foreign Application Priority Data

Jul. 10, 2020 (JP) ................................. 2020-119456
Jan. 29, 2021 (JP) ................................. 2021-013169

(51) Int. Cl.
*H02K 33/02* (2006.01)
*G06F 3/01* (2006.01)
*G06F 3/0354* (2013.01)

(52) U.S. Cl.
CPC ............ *H02K 33/02* (2013.01); *G06F 3/016* (2013.01); *G06F 3/03545* (2013.01)

(58) Field of Classification Search
CPC .. H02K 7/1869; H02K 7/1876; H02K 7/1892; H02K 33/00; H02K 33/02; H02K 33/16; G06F 3/016; G06F 3/03545
(Continued)

(56) References Cited

U.S. PATENT DOCUMENTS 2,906,898 A * 9/1959 Missien ............... B25D 11/064
   310/30
4,920,288 A * 4/1990 den Heijer ............... F25B 9/14
   310/90
(Continued)

FOREIGN PATENT DOCUMENTS

JP     H0560158     3/1993
JP     H10127033    5/1998
(Continued)

OTHER PUBLICATIONS

Hirata et al., "Cvibration Motor With Elastic Membmer and Tactile Device", U.S. Appl. No. 17/369,977, filed Jul. 8, 2021.

*Primary Examiner* — Maged M Almawri
(74) *Attorney, Agent, or Firm* — JCIPRNET

(57) ABSTRACT

A vibration motor and a tactile device are provided. The vibration motor has: a stationary portion; a movable portion having a magnet and capable of vibrating with respect to the stationary portion along a central axis extending in an up-down direction; and an elastic member. The stationary portion has: a housing, disposed radially outside from the movable portion and having a cylindrical shape extending along the central axis; a top surface portion, disposed above the movable portion, fixed to the housing, and extended in a direction intersecting with the central axis; and a coil, capable of applying a driving force to the movable portion. The elastic member is disposed below the top surface portion and above the movable portion. The elastic member is fixed to the top surface portion and the movable portion and supports the movable portion so that the movable portion can vibrate along the central axis.

9 Claims, 15 Drawing Sheets

(58) Field of Classification Search
USPC ........ 310/25, 15, 12.01, 81, 80, 321, 20, 21, 310/28–30, 36–37, 40 MM
See application file for complete search history.

(56) References Cited

U.S. PATENT DOCUMENTS

| | | | | |
|---|---|---|---|---|
| 5,924,975 | A * | 7/1999 | Goldowsky | F04B 53/125 600/16 |
| 6,323,568 | B1 * | 11/2001 | Zabar | F04B 17/042 310/12.24 |
| 6,326,706 | B1 * | 12/2001 | Zhang | F04B 35/045 310/12.32 |
| 6,644,943 | B1 * | 11/2003 | Lilie | F04B 35/045 417/418 |
| 6,737,780 | B1 * | 5/2004 | Fisher | H02K 1/17 310/154.14 |
| 7,078,832 | B2 * | 7/2006 | Inagaki | H02K 7/14 335/238 |
| 7,316,545 | B2 * | 1/2008 | Lenke | F01N 3/2066 92/169.1 |
| 7,504,794 | B2 * | 3/2009 | Sato | H02K 41/0356 318/135 |
| 7,573,163 | B2 * | 8/2009 | Tu | H01F 7/021 310/12.21 |
| 7,981,107 | B2 * | 7/2011 | Olsen | A61M 5/14276 604/152 |
| 8,314,519 | B2 * | 11/2012 | Eckstein | F16H 25/20 310/12.01 |
| 8,368,268 | B2 * | 2/2013 | Hasegawa | G02B 21/248 359/381 |
| 8,446,055 | B2 * | 5/2013 | Jun | H02K 33/16 310/23 |
| 9,004,883 | B2 * | 4/2015 | Neelakantan | F04B 17/046 417/415 |
| 9,692,286 | B2 * | 6/2017 | Endo | H02K 33/16 |
| 9,692,287 | B2 * | 6/2017 | Yamamoto | H02K 35/02 |
| 9,906,109 | B2 * | 2/2018 | Endo | H02K 33/16 |
| 10,424,429 | B2 * | 9/2019 | Fatemi | H01F 7/1607 |
| 10,447,133 | B2 * | 10/2019 | Jin | H02K 33/18 |
| 10,547,233 | B2 * | 1/2020 | Jin | H02K 5/04 |
| 10,566,888 | B2 * | 2/2020 | Degner | H02K 33/18 |
| 10,674,278 | B2 * | 6/2020 | Zhou | H04R 9/025 |
| 10,890,169 | B2 * | 1/2021 | Jeong | F04B 39/0061 |
| 11,031,857 | B2 * | 6/2021 | Wasenczuk | H02N 2/186 |
| 11,152,843 | B2 * | 10/2021 | Wasenczuk | H02K 1/34 |
| 11,258,343 | B2 * | 2/2022 | Harrison | H02K 33/00 |
| 11,309,808 | B1 * | 4/2022 | Li | H02K 35/02 |
| 11,670,997 | B2 * | 6/2023 | Hirata | H02K 33/02 310/29 |
| 2002/0195884 | A1 * | 12/2002 | Ichii | A61C 17/34 310/15 |
| 2003/0185000 | A1 * | 10/2003 | Mah | H02K 35/02 362/192 |
| 2004/0119343 | A1 * | 6/2004 | Ueda | G10K 9/22 310/12.31 |
| 2004/0241017 | A1 * | 12/2004 | Buzzi | F04B 19/006 417/415 |
| 2005/0088842 | A1 * | 4/2005 | Mah | F21L 13/06 362/157 |
| 2005/0089418 | A1 * | 4/2005 | Bonfardeci | F04B 17/046 417/417 |
| 2005/0151375 | A1 * | 7/2005 | Cheung | B60C 23/041 290/1 R |
| 2007/0040457 | A1 * | 2/2007 | Shimizu | A61C 17/3445 310/15 |
| 2007/0052302 | A1 * | 3/2007 | Cheung | B82Y 25/00 310/12.25 |
| 2009/0051471 | A1 * | 2/2009 | Zhao | H01F 7/1607 335/261 |
| 2009/0218894 | A1 * | 9/2009 | Aso | F16C 29/0685 310/12.31 |
| 2009/0232666 | A1 * | 9/2009 | Choi | H02K 33/16 417/212 |
| 2011/0057629 | A1 * | 3/2011 | Lin | H02K 35/02 322/3 |
| 2011/0133577 | A1 * | 6/2011 | Lee | H02K 33/18 310/15 |
| 2011/0169347 | A1 * | 7/2011 | Miyamoto | G06F 3/016 310/12.21 |
| 2011/0198949 | A1 * | 8/2011 | Furuich | H02K 33/16 310/25 |
| 2011/0316361 | A1 * | 12/2011 | Park | H02K 33/16 310/25 |
| 2012/0062047 | A1 * | 3/2012 | Nakagawa | H02K 33/16 310/17 |
| 2012/0086213 | A1 * | 4/2012 | Chan | H02K 7/088 310/90 |
| 2012/0119593 | A1 * | 5/2012 | Yajima | H02K 41/031 310/12.21 |
| 2013/0010999 | A1 * | 1/2013 | Lastrucci | H02K 33/16 381/400 |
| 2013/0169071 | A1 * | 7/2013 | Endo | H02K 33/12 310/25 |
| 2014/0035397 | A1 * | 2/2014 | Endo | H02K 33/18 310/30 |
| 2014/0062224 | A1 * | 3/2014 | Kim | H02K 33/16 310/15 |
| 2014/0062225 | A1 * | 3/2014 | Kim | H02K 33/00 310/15 |
| 2014/0077628 | A1 * | 3/2014 | Yamada | H02K 33/12 310/12.16 |
| 2014/0084710 | A1 * | 3/2014 | Endo | H02K 33/16 310/25 |
| 2014/0265651 | A1 * | 9/2014 | Kim | H02K 33/16 310/25 |
| 2014/0306556 | A1 * | 10/2014 | Kim | H02K 33/16 310/25 |
| 2015/0137628 | A1 * | 5/2015 | Endo | H02K 33/16 310/25 |
| 2015/0206639 | A1 * | 7/2015 | Odajima | B06B 1/045 335/235 |
| 2016/0094115 | A1 * | 3/2016 | Okawa | A61C 17/3445 310/25 |
| 2016/0164389 | A1 * | 6/2016 | Jang | H02K 7/116 310/20 |
| 2017/0070131 | A1 * | 3/2017 | Degner | H02K 33/00 |
| 2017/0216884 | A1 * | 8/2017 | Katada | H02K 33/02 |
| 2017/0250596 | A1 * | 8/2017 | Son | H02K 7/08 |
| 2018/0056329 | A1 * | 3/2018 | Akanuma | H02K 33/16 |
| 2018/0212487 | A1 * | 7/2018 | Jiang | H02K 33/16 |
| 2018/0219465 | A1 * | 8/2018 | Katada | B06B 1/045 |
| 2018/0250107 | A1 * | 9/2018 | Dai | H02K 1/2791 |
| 2019/0044425 | A1 * | 2/2019 | Zu | H02K 33/02 |
| 2019/0107312 | A1 * | 4/2019 | Noh | F04B 39/125 |
| 2019/0151895 | A1 * | 5/2019 | Takahashi | B06B 1/045 |
| 2019/0212838 | A1 | 7/2019 | Takeda et al. | |
| 2019/0366383 | A1 * | 12/2019 | Yoshimura | F16F 1/328 |
| 2021/0384810 | A1 * | 12/2021 | Shirato | B06B 1/04 |

FOREIGN PATENT DOCUMENTS

| | | |
|---|---|---|
| JP | 2002205008 | 7/2002 |
| JP | 2003145044 | 5/2003 |
| JP | 2014028349 | 2/2014 |
| WO | 2018030266 | 2/2018 |

\* cited by examiner

VIBRATION MOTOR WITH BEARING PORTION AND AIR PASSAGE AND AIR HOLE

CROSS REFERENCE TO RELATED APPLICATIONS

This application is a continuation application of and claims priority benefit of a prior application Ser. No. 17/369,977, filed on Jul. 8, 2021, now allowed. The prior application Ser. No. 17/369,977 claims priority under 35 U.S.C. § 119 to Japanese Application No. 2020-119456 filed on Jul. 10, 2020, and Japanese Application No. 2021-013169 filed on Jan. 29, 2021, the entire contents of which are hereby incorporated herein by references.

FIELD OF THE INVENTION

The present disclosure relates to a vibration motor and a tactile device having the vibration motor.

BACKGROUND

Conventionally, a vibration motor may be included as a vibration generator in various instruments, for example, a portable instrument such as a smartphone or the like. The vibration motor is usually used in, for example, a function of notifying a user of an incoming call, an alarm, or the like; a function of tactile feedback in human interface; or the like.

A conventional vibration apparatus usually has: a moving body, a magnetic fluid, an electromagnet, and a storage member. The magnetic fluid is usually disposed on both end surface sides of the moving body in a reciprocation direction. The electromagnet usually has an electrode which can be connected to a predetermined alternating current power supply. The electromagnet usually has a magnetic pole which faces each magnetic pole of the moving body via the magnetic fluid. The storage member usually stores the moving body in a way that the moving body can slide in the reciprocation direction.

However, in the conventional vibration apparatus, the reciprocation of the moving body is supported by the magnetic fluid, and thus coupling between the magnetic fluid and other members may be difficult. Thus, it may be difficult for the moving body to be stably reciprocated.

An illustrative embodiment of a vibration motor of the present disclosure has: a stationary portion; a movable portion which has a magnet and is capable of vibrating with respect to the stationary portion along a central axis extending in an up-down direction; and an elastic member. The stationary portion has: a housing which is disposed radially outside from the movable portion and has a cylindrical shape extending along the central axis; a top surface portion which is disposed above the movable portion, is fixed to the housing, and extends in a direction intersecting with the central axis; and a coil which can apply a driving force to the movable portion. The elastic member is disposed below the top surface portion and above the movable portion. The elastic member is fixed to both the top surface portion and the movable portion, and supports the movable portion in a way that the movable portion is capable of vibrating along the central axis.

The above and other elements, features, steps, characteristics, and advantages of the present disclosure will become more apparent from the following detailed description of the preferred embodiments with reference to the attached drawings.

DESCRIPTION OF THE EMBODIMENTS

Figure 1:
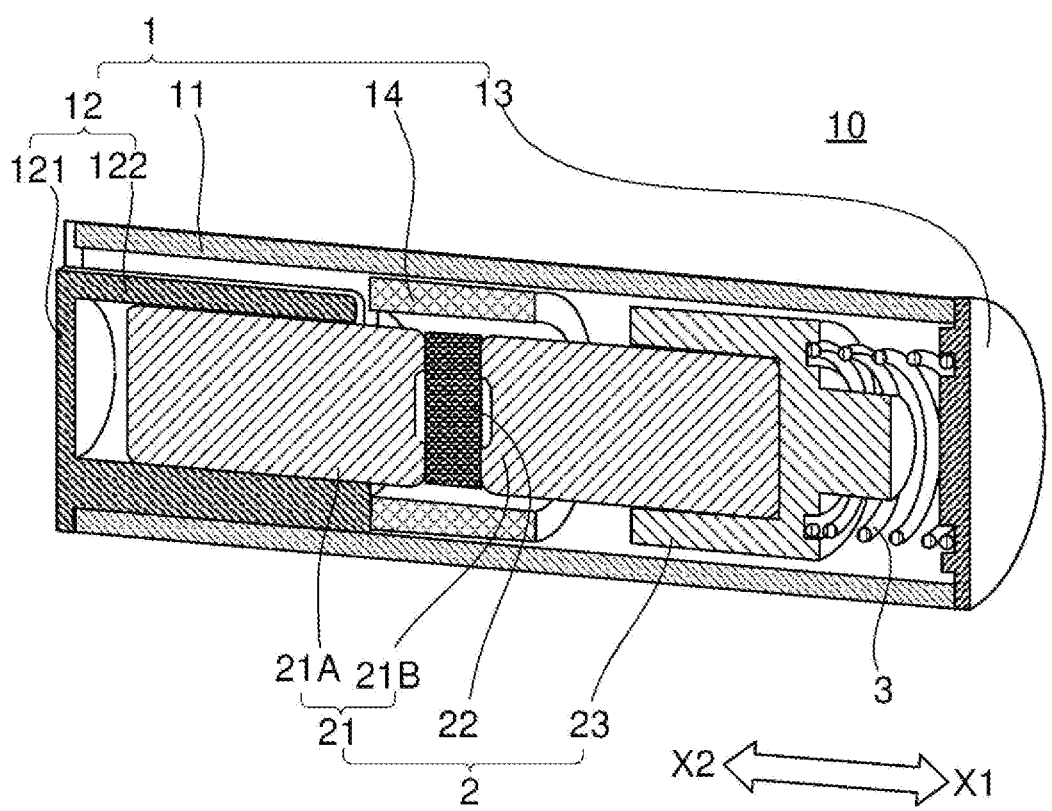
FIG. 1 is a cross-sectional perspective view of a vibration motor according to an illustrative first embodiment of the present disclosure.

Hereinafter, illustrative embodiments of the present disclosure are described with reference to the drawings.

In the drawings, a direction in which a central axis J of a vibration motor extends is shown as an "up-down direction", an upper side is shown as X1, and a lower side is shown as X2. Moreover, the up-down direction does not limit an attachment direction of the vibration motor when the vibration motor is mounted on an instrument. In addition, a radial direction with respect to the central axis J is simply referred to as a "radial direction".

Figure 2:
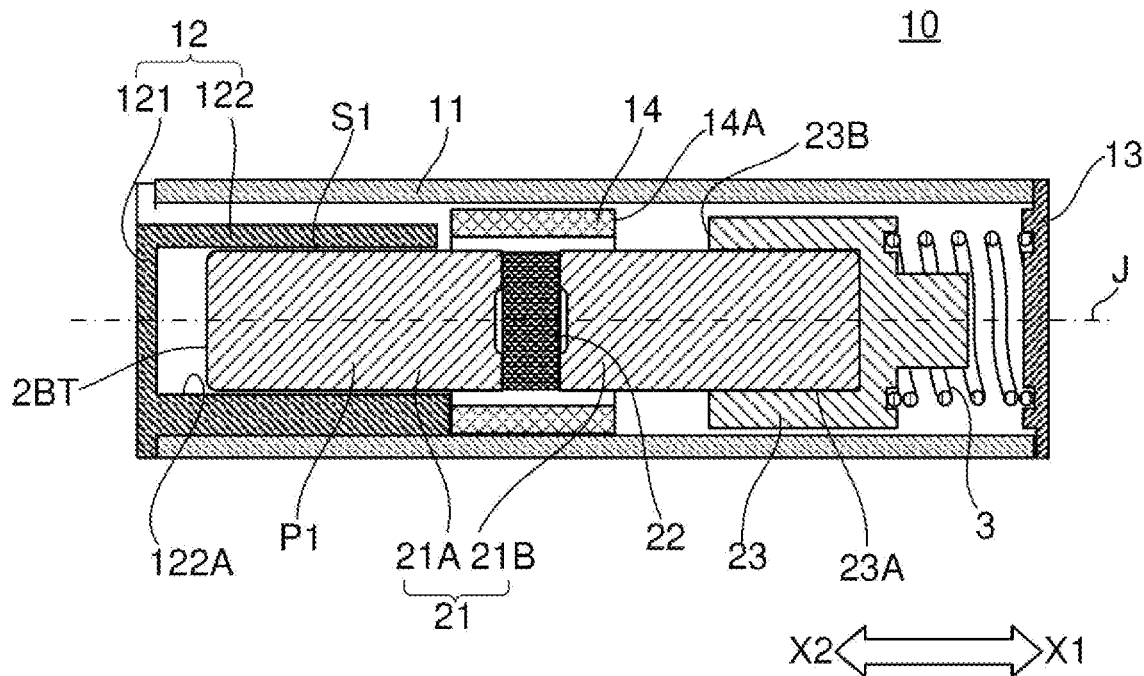
FIG. 2 is a side cross-sectional view of the vibration motor shown in FIG. 1.

Firstly, an illustrative first embodiment of the present disclosure is described. FIG. 1 is a cross-sectional perspective view of a vibration motor 10 according to the illustrative first embodiment of the present disclosure. FIG. 2 is a side cross-sectional view of the vibration motor 10 shown in FIG. 1.

The vibration motor 10 has a stationary portion 1, a movable portion 2, and an elastic member 3. The movable portion 2 can vibrate with respect to the stationary portion 1 along the central axis J extending in the up-down direction (an X direction).

The stationary portion 1 has a housing 11, a top surface portion 13, and a coil 14. The stationary portion 1 further has a first sleeve bearing 12. The housing 11 is a circular cylindrical member extending along the central axis J. Moreover, the housing 11 is not limited to the circular cylindrical shape and may have, for example, a square cylindrical shape or the like. The housing 11 is configured by a magnetic body. The magnetic body is, for example, stainless steel. The housing 11 accommodates the movable portion 2 described later inside. That is, the stationary portion 1 has the housing 11 disposed radially outside from the movable portion 2 and having a cylindrical shape which extends along the central axis J.

The first sleeve bearing 12 has a first lid portion 121 and a first bearing portion 122. That is, the stationary portion 1 has the first lid portion 121 and the first bearing portion 122. The first lid portion 121 has a substantially disc-like shape. The first bearing portion 122 has a substantially circular cylindrical shape which protrudes upward from the first lid portion 121 and extends in the up-down direction. That is, the stationary portion 1 has the first bearing portion 122 having a cylindrical shape extending along the central axis J. Moreover, the first lid portion 121 is not limited to the substantially disc-like shape and may have, for example, a substantially square-plate-like shape. The first bearing portion 122 is not limited to the substantially circular cylindrical shape and may have, for example, a substantially square cylindrical shape. The first lid portion 121 and the first bearing portion 122 constitute the first sleeve bearing 12 which is a single member. Moreover, the first lid portion 121 and the first bearing portion 122 may be separate bodies. In that case, the first lid portion 121 and the housing 11 may constitute a single member.

The first sleeve bearing 12 is inserted into the housing 11 from below the housing 11 and is fixed to the housing 11. The first lid portion 121 blocks a bottom end part of the housing 11. The first bearing portion 122 is disposed inside the housing 11 above the first lid portion 121.

The first sleeve bearing 12 is configured from, for example, a resin having low friction coefficient and low wear. The resin is, for example, POM (polyacetal).

The stationary portion 1 has the top surface portion 13. The top surface portion 13 has a substantially disc-like shape, blocks an upper end part of the housing 11, and is fixed to the upper end part. That is, the stationary portion 1 has the top surface portion 13 disposed above the movable portion 2, fixed to the housing 11, and extending in a direction which intersects with the central axis J. Moreover, the top surface portion 13 is not limited to the substantially disc-like shape and may have, for example, a substantially square-plate-like shape. A case is configured from the housing 11, the first lid portion 121, and the top surface portion 13.

The coil 14 is formed in a way that a conducting wire is wound around the central axis J extending in the up-down direction of the movable portion 2, and is fixed to an inner surface of the housing 11. The coil 14 has a ring shape surrounding the central axis J. The housing 11 accommodates the coil 14 inside. The coil 14 generates a magnetic field by energization. That is, the stationary portion 1 has the coil 14 which can apply a driving force to the movable portion 2. The coil 14 is fixed to an upper end surface of the first bearing portion 122.

The movable portion 2 has a magnet 21. The movable portion 2 further has a magnetic body 22 and a holder 23, and is accommodated inside the housing 11. The magnet 21 has a magnet portion 21A on the lower side and a magnet portion 21B on the upper side. The magnetic body 22 is clamped from both sides in the up-down direction by the magnet portions 21A and 21B. The magnet portions 21A and 21B and the magnetic body 22 have a substantially circular columnar shape extending in the up-down direction. Moreover, the magnet portions 21A and 21B and the magnetic body 22 are not limited to the substantially circular columnar shape, and may have, for example, a substantially square columnar shape.

The upper part of the magnet portion 21A is an N-pole, and the lower part of the magnet portion 21A is an S-pole. The lower part of the magnet portion 21B is an N-pole, and the upper part of the magnet portion 21B is an S-pole. That is, the N-poles face each other in the up-down direction with the magnetic body 22 therebetween. The housing 11 is configured by a magnetic body, and thereby magnetic fields generated by the magnet 21 and the coil 14 can be suppressed from leaking to the outside of the vibration motor 10, and a magnetic force can be increased. Moreover, the S-poles may face each other in the up-down direction with the magnetic body 22 therebetween.

The holder 23 holds the upper part of the magnet portion 21B (the magnet 21). That is, the movable portion 2 has the holder 23 which is disposed above the magnet 21 and holds the magnet 21. The holder 23 has a columnar recessed portion 23A which is recessed upward in a circular columnar shape. The upper part of the magnet portion 21B is fitted to the columnar recessed portion 23A. The holder 23 functions as a weight and is configured by, for example, a tungsten alloy. The other side surface in a first direction 14A of the coil 14 is disposed facing one side surface in the first direction 23B of the holder 23 in the first direction. Accordingly, compared with a case in which the entire the other side surface in the first direction 14A of the coil 14 is disposed radially outside from the one side surface in the first direction 23B of the holder 23, a size of the vibration motor 10 in the radial direction can be reduced.

The elastic member 3 is a spiral spring wound around the central axis J. A bottom end part of the elastic member 3 is fixed to an upper end surface of the holder 23, and an upper end part of the elastic member 3 is fixed to an inner surface of the top surface portion 13. The fixing of the elastic member 3 is performed by, for example, adhesion. That is, the elastic member 3 is disposed between the holder 23 and the top surface portion 13. The stationary portion 1 has the elastic member 3 which is disposed below the top surface portion 13 and above the movable portion 2. The elastic member 3 is fixed to both the top surface portion 13 and the movable portion 2, and supports the movable portion 2 in a way that the movable portion 2 can vibrate along the central axis J. Moreover, the fixing of the elastic member 3 is not limited to adhesion and may be performed by, for example, welding, fitting, caulking, or the like.

The first bearing portion 122 has a bearing inner peripheral surface 122A having a circular cylindrical shape. In a case of a non-operating state in which the coil 14 is not energized and the movable portion 2 is in a stationary state, a part of the magnet portion 21A on the lower side is accommodated inside the first bearing portion 122 with a gap S1 from the bearing inner peripheral surface 122A. That is, the first bearing portion 122 has the bearing inner peripheral surface 122A which is disposed with the gap S1 from the outer side surface of a lower part P1 of the movable portion 2. A radial inner side surface of the first bearing portion 122 is disposed facing a radial outer side surface of the movable portion 2 in the radial direction. The first bearing portion 122 is a bearing portion of the vibration motor 10. Moreover, FIG. 1 and FIG. 2 show the vibration motor 10 in the non-operating state.

In the non-operating state, the magnetic body 22 is positioned on the inner side of the coil 14. The coil 14 is disposed radially outside from a radial outer side surface of the magnet 21. The coil 14 has a ring shape surrounding the central axis J. In addition, in the non-operating state, the elastic member 3 has a natural length, but the elastic member 3 is easily fixed to the movable portion 2 by the holder 23.

By the interaction between the magnetic field which is generated from the coil 14 by energizing the coil 14 and the magnetic field which is generated by the magnet 21, a driving force is applied to the magnet 21. That is, a driving force is applied to the movable portion 2, and thereby the movable portion 2 vibrates in the up-down direction. According to the configuration of the coil 14, the vibration of the movable portion 2 is stabilized.

The elastic member 3 is fixed to both the top surface portion 13 and the movable portion 2, and thus the vibration of the movable portion 2 is stabilized. Thus, the vibration motor 10 can generate a stable vibration.

In addition, as shown in FIG. 2, the entire bottom surface 2BT of the movable portion 2 directly faces the first lid portion 121 in the up-down direction. That is, the entire bottom surface 2BT of the movable portion 2 directly faces a bottom end part of the vibration motor 10 in the up-down direction. Accordingly, a lower part of the movable portion 2 is supported by the first bearing portion 122, but is not supported in the up-down direction. Accordingly, compared with a case in which the movable portion is supported from both sides in the up-down direction by elastic members or the like, resilience of the movable portion in the up-down direction can be suppressed from becoming greater than necessary. Thus, the vibration of the movable portion in the up-down direction can be increased. In addition, there is no need to dispose an elastic member below the movable portion 2, and thus the configuration of the vibration motor 10 becomes simple, and mass-productivity is improved. In addition, if the cantilever configuration of this movable portion 2 using the elastic member 3 is used, it is important to fix the elastic member 3 to both the top surface portion 13 and the movable portion 2.

Moreover, the entire bottom surface 2BT of the movable portion 2 may directly face the external space of the vibration motor 10. That is, in the configuration of FIG. 2, the first lid portion 121 may not be arranged.

In addition, in a case in which the movable portion 2 is in contact with the bearing inner peripheral surface 122A (the radial inner side surface) of the first bearing portion 122 when the movable portion 2 vibrates, the movable portion 2 slides with respect to the first bearing portion 122 that is stationary, and thus the movement of the movable portion 2 is restricted to unidirectional movement. Thus, the vibration of the movable portion 2 is stabilized. In addition, when the housing 11 is configured by a magnetic body, a phenomenon can be suppressed from occurring in which the movable portion 2 is attracted and stuck to the housing 11 configured by the magnetic body by an attractive force, and the movable portion 2 can be stably operated.

In addition, when the movable portion 2 moves downward, the air which is accommodated in a space surrounded by the first bearing portion 122 and the first lid portion 121 is pressed by the movable portion 2, and thereby effect of damper is exerted. Accordingly, a distance between the movable portion 2 and the first lid portion 121 in the first direction can be appropriately maintained.

In addition, in the configuration of the vibration motor in which supposing that two elastic members are arranged by respectively disposing the elastic members on the upper side and the lower side, there is a possibility that a mismatch may occur in characteristics of each elastic member, and it is difficult to stabilize product performance such as a resonance frequency or the like. In contrast, in the configuration of the embodiment, the number of the elastic member 3 is one, and thus stabilization of product performance can be achieved. In addition, compared with the configuration in which a holder and an elastic member are arranged on the lower side when the two elastic members are arranged as described above, the holder and the elastic member can be replaced by the first bearing portion 122 in the configuration of the embodiment, and thus costs can be reduced.

Hereinafter, various variation examples of the first embodiment described above are described. Moreover, various variation examples described below can be implemented in appropriate combination.

Figure 3:
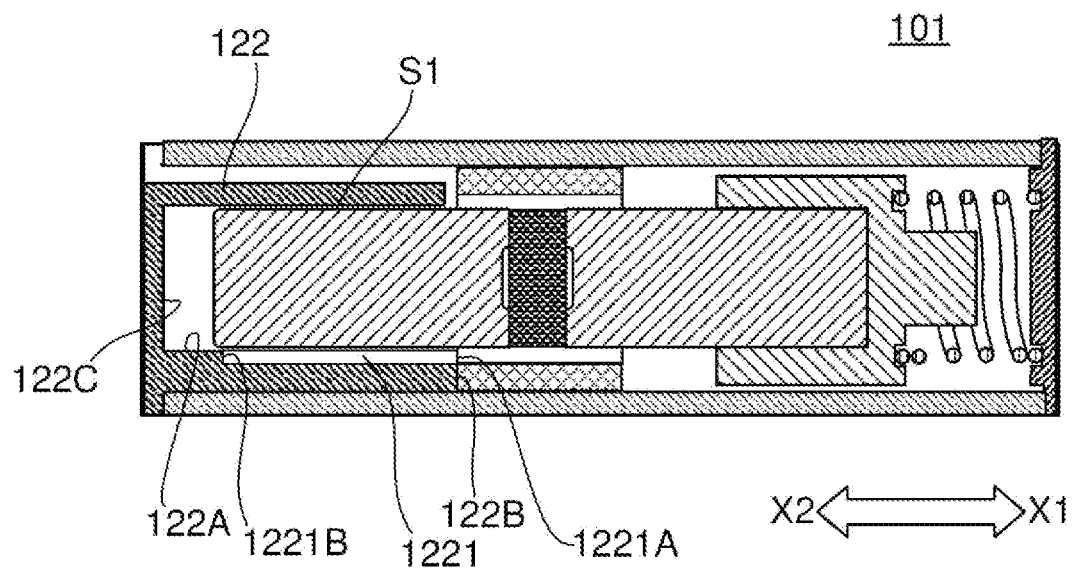
FIG. 3 is a side cross-sectional view of a vibration motor according to a first variation example.

FIG. 3 is a side cross-sectional view of a vibration motor 101 according to a first variation example. As shown in FIG. 3, in the first variation example, a groove portion 1221 is arranged in the first bearing portion 122. The groove portion 1221 is arranged in the bearing inner peripheral surface 122A. The groove portion 1221 extends along the up-down direction. Moreover, the groove portion 1221 is contained in the gap S1.

Figure 4:
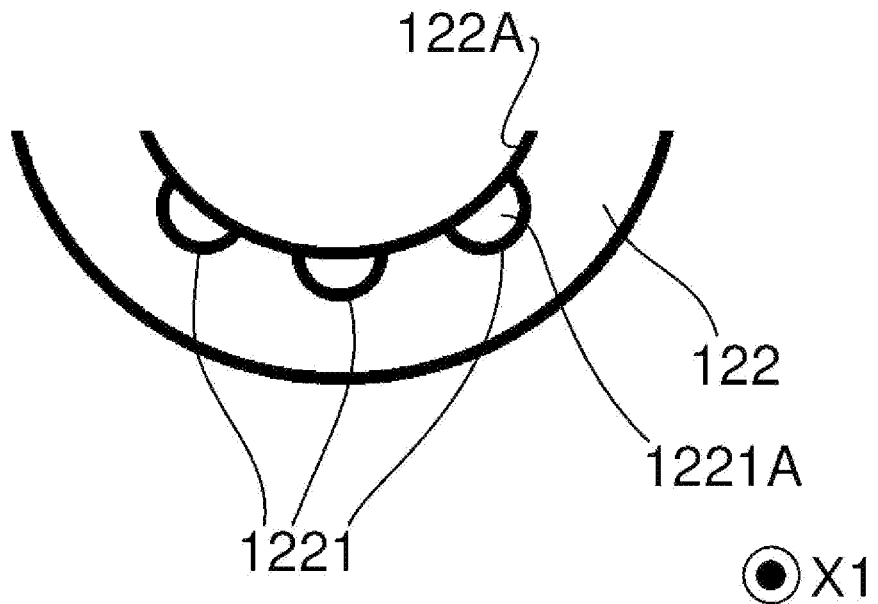
FIG. 4 is a front view of a part of a first bearing portion when viewed from above.

FIG. 4 is a front view of a part of the first bearing portion 122 when viewed from above. As shown in FIG. 4, a plurality of the groove portions 1221 are arranged. Moreover, the number of the groove portion 1221 may be one. That is, the bearing inner peripheral surface 122A has at least one groove portion 1221 arranged along the up-down direction.

An upper end 1221A of the groove portion 1221 is open at an upper end 122B of the first bearing portion 122. That is, the upper end 1221A of the groove portion 1221 is positioned at the upper end 122B of the first bearing portion 122.

In addition, a bottom end 1221B of the groove portion 1221 is positioned above a bottom end 122C of the first bearing portion 122.

Figure 5:
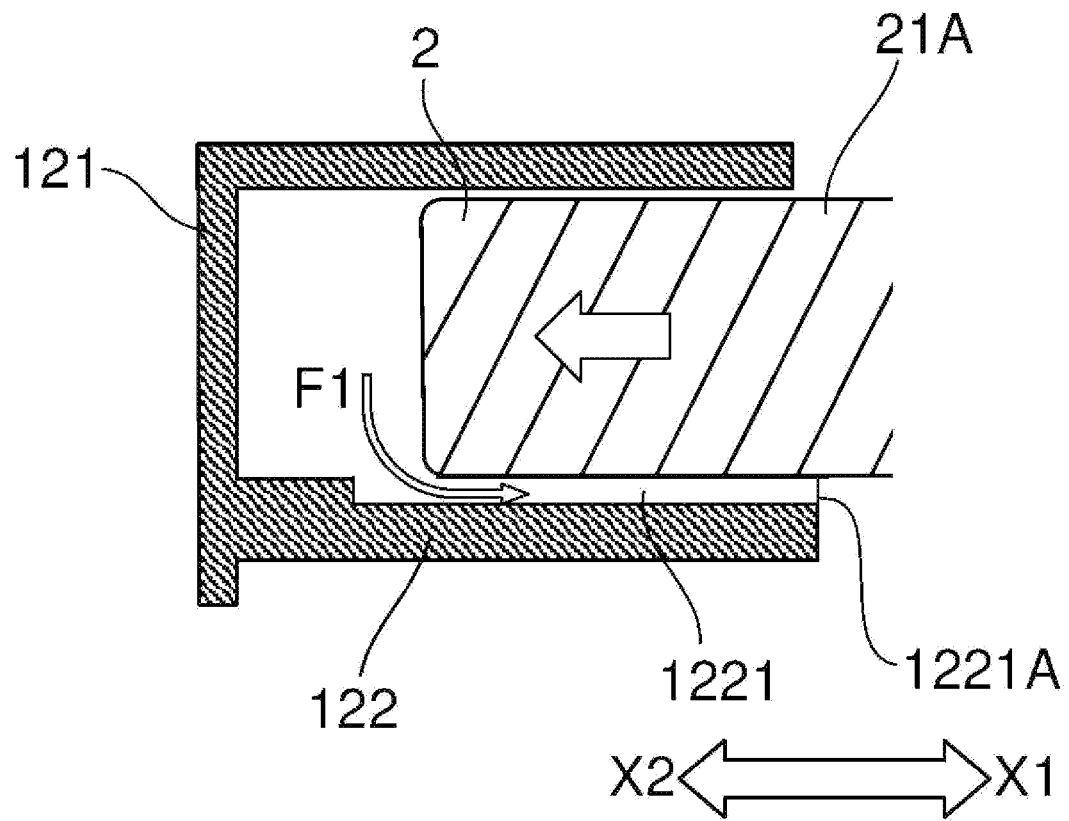
FIG. 5 is a diagram schematically showing how air escapes in the first variation example.

In this first variation example, as shown in FIG. 5, when the movable portion 2 (the magnet portion 21A) moves downward in the operating state, the air pressed by the movable portion 2 escapes to the groove portion 1221. Moreover, a flow F1 of air is shown in FIG. 5. Accordingly, the effect of damper is weakened, and a sliding property of the movable portion 2 can be improved.

In addition, the air that escapes to the groove portion 1221 flows to the outside from the upper end 1221A, and thus the air escapes more easily, and the sliding property of the movable portion 2 can be further improved.

Figure 6:
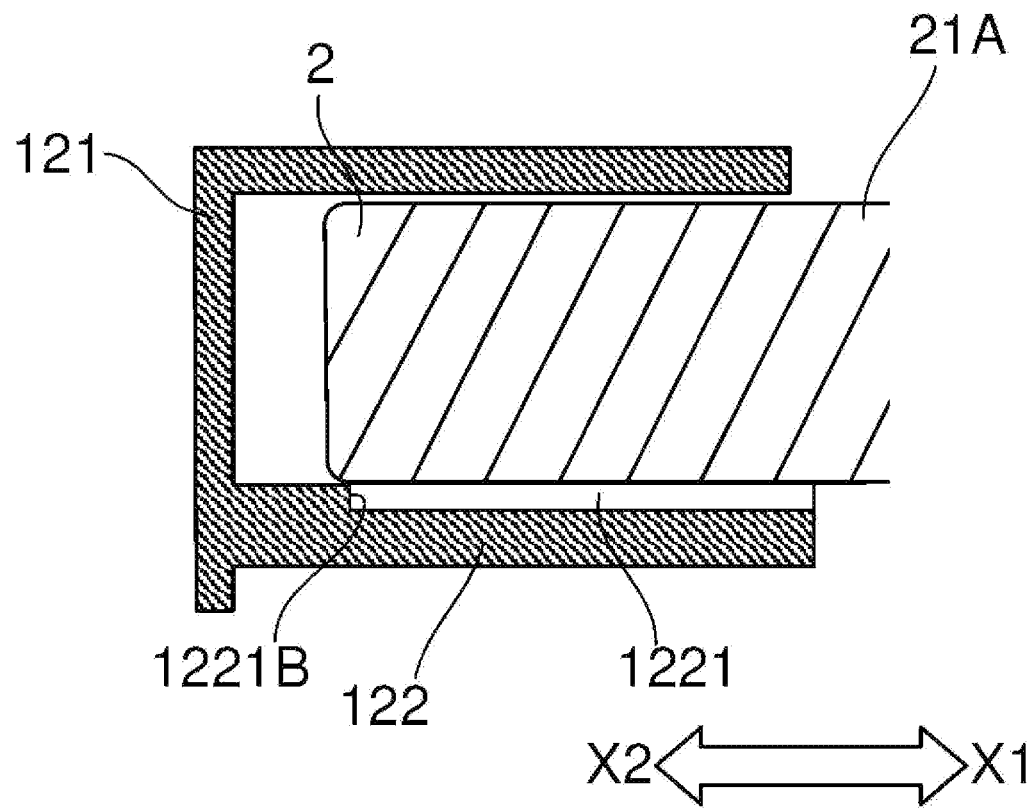
FIG. 6 is a diagram showing a state in which a movable portion moves to a position beyond a groove portion in the first variation example.

In addition, as shown in FIG. 6, if the movable portion 2 moves downward beyond the bottom end 1221B when the movable portion 2 moves in the up-down direction, the escape of air is suppressed, and resistance generated by air is increased. Thus, the movable portion 2 can be suppressed from coming into contact with the first lid portion 121.

Figure 7:
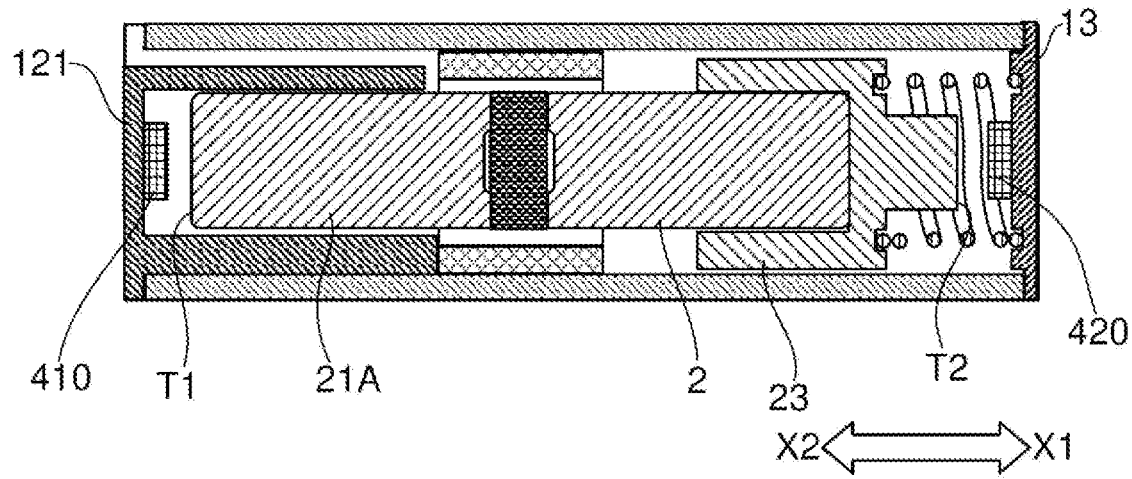
FIG. 7 is a side cross-sectional view of a vibration motor according to a second variation example.

FIG. 7 is a side cross-sectional view of a vibration motor 102 according to a second variation example. The vibration motor 102 has buffer members 410 and 420. The buffer members 410 and 420 are configured from, for example, silicone rubber, thermoplastic polyurethane, or the like.

The buffer member 410 is fixed to an inner surface of the first lid portion 121 facing a bottom end surface T1 of the movable portion 2 (the magnet portion 21A) in the up-down direction. The buffer member 420 is fixed to an inner surface of the top surface portion 13 facing an upper end surface T2 of the movable portion 2 (the holder 23) in the up-down direction. The fixing of the buffer members 410 and 420 is performed by, for example, a double-sided tape.

Moreover, only one of the buffer members 410 and 420 may be arranged. That is, the stationary portion 1 has the buffer members 410 and 420 disposed on at least one of the inner surface of the first lid portion 121 facing the bottom end surface T1 of the movable portion 2 in the up-down direction, and the inner surface of the top surface portion 13 facing the upper end surface T2 of the movable portion 2 in the up-down direction.

The movable portion 2 is not in contact with the buffer members 410 and 420 during the normal action. However, in a case in which the vibration motor 102 is dropped or other cases, the bottom end surface T1 of the movable portion 2 is in contact with the buffer member 410, or the upper end surface T2 of the movable portion 2 is in contact with the buffer member 420. Thus, a noise or the like generated by the contact of the movable portion 2 and the stationary portion 1 can be suppressed.

In a third variation example, in the vibration motor 10 according to the first embodiment, lubricant or a magnetic fluid may be disposed in the gap S1. The lubricant is, for example, oil. Moreover, when the magnetic fluid is disposed, the magnetic fluid moves together with the magnet portion 21A.

Accordingly, the movable portion 2 moves easily in the up-down direction more. In addition, the wear of the movable portion 2 can be suppressed, and longevity can be achieved. Furthermore, the generation of a sound caused by friction between the movable portion 2 and the first bearing portion 122 can be suppressed, and quietness can be improved.

Figure 8:
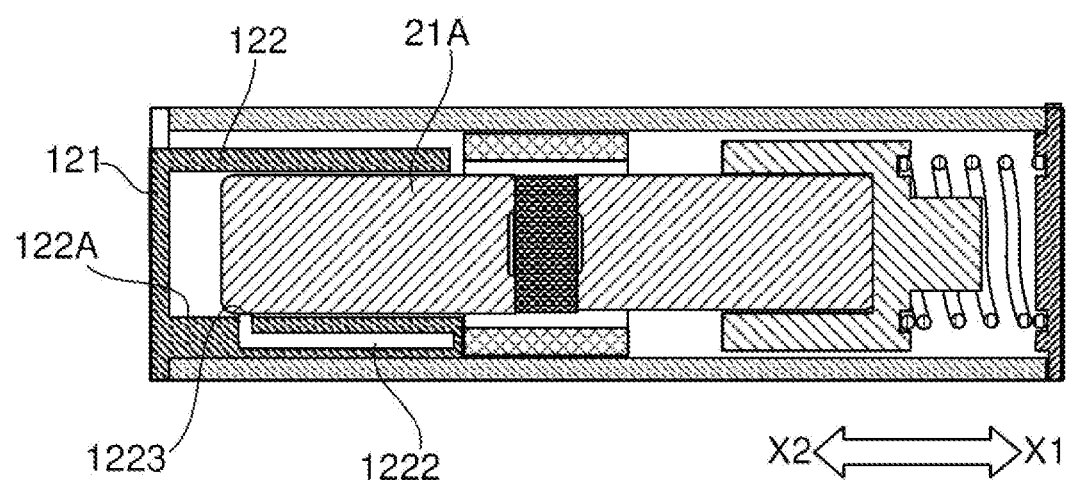
FIG. 8 is a side cross-sectional view of a vibration motor according to a fourth variation example.

FIG. 8 is a side cross-sectional view of a vibration motor 104 according to a fourth variation example. As shown in FIG. 8, in the vibration motor 104, the first bearing portion 122 has an air passage 1222 and an air hole 1223. The air passage 1222 is disposed along the up-down direction. The air hole 1223 is communicated with the air passage 1222 and is disposed in the bearing inner peripheral surface 122A.

Moreover, the upper part of the air passage 1222 in FIG. 8 does not extend to the upper end surface of the first bearing portion 122. Moreover, as an embodiment described later, the air passage may extend to the upper end surface of the first bearing portion 122 and open. In addition, the air passage may extend downward from the air hole 1223. In that case, the air passage may extend to a bottom end surface of the first lid portion 121 and open.

Figure 9:
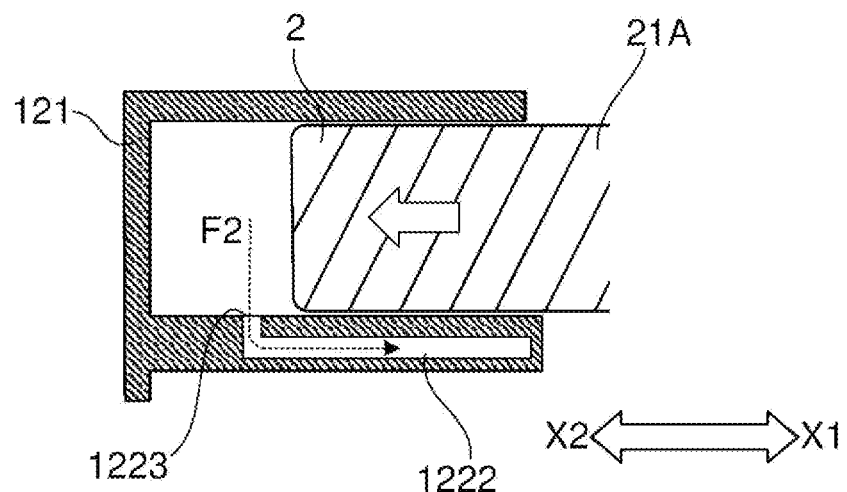
FIG. 9 is a diagram schematically showing how air escapes in the fourth variation example.
Figure 10:
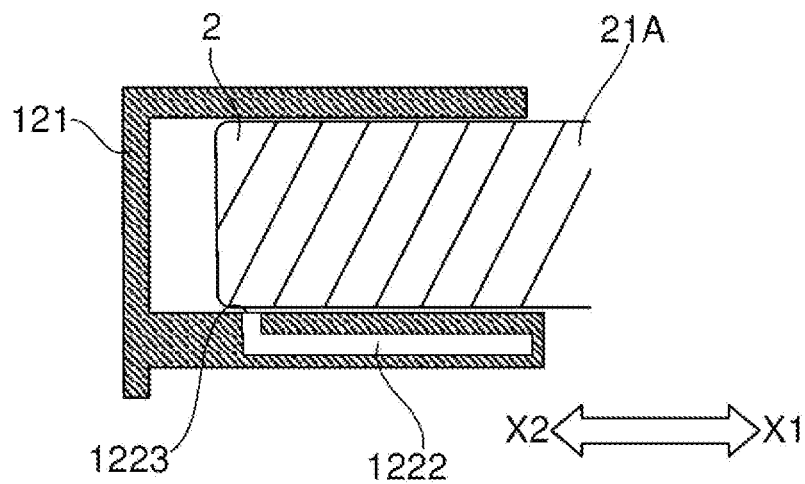
FIG. 10 is a diagram showing a state in which a movable portion moves to a position beyond an air hole in the fourth variation example.

According to the configuration shown in FIG. 8, as shown in FIG. 9, in a case in which the movable portion 2 is positioned above the air hole 1223 when the movable portion 2 moves in the up-down direction, the air pressed by the movable portion 2 flows into the air passage 1222 via the air hole 1223, and the movable portion 2 moves downward easily. Moreover, in FIG. 9, a flow F2 of air is shown. Besides, as shown in FIG. 10, if the movable portion 2 moves downward beyond the air hole 1223, the air hole 1223 is blocked, the escape of air is suppressed, and resistance of air is increased. Thus, the distance between the movable portion 2 and the first lid portion 121 in the first direction can be appropriately maintained.

Moreover, the group of the air passage and the air hole is not limited to one set, and a plurality of sets may be arranged side by side in a peripheral direction of the first bearing portion 122.

Figure 11:
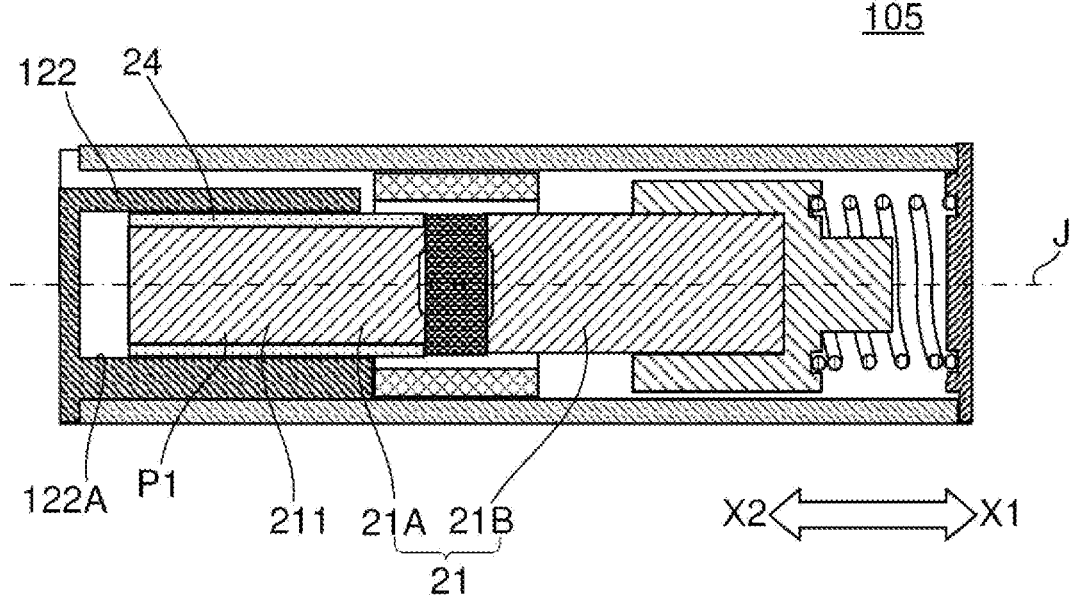
FIG. 11 is a side cross-sectional view of a vibration motor according to a fifth variation example.

FIG. 11 is a side cross-sectional view of a vibration motor 105 according to a fifth variation example. As shown in FIG. 11, in the vibration motor 105, a first sliding member 24 covering an outer peripheral surface of the magnet portion 21A is formed. That is, the lower part P1 of the movable portion 2 has one part 211 of the magnet 21 (the magnet portion 21A), and the first sliding member 24 disposed on an outer peripheral surface of the one part 211. The first sliding member 24 is configured by, for example, a fluorine layer or the like having a lower friction coefficient. Moreover, the magnet portion 21A may be a member having a circular columnar shape, a square columnar shape, or the like. The first sliding member 24 may be formed on a radial outer side surface of the magnet 21A.

According to this configuration, the wear of the magnet 21 caused by the sliding action of the movable portion 2 which is in contact with the bearing inner peripheral surface 122A can be suppressed, and a magnetic flux change caused by the wear can be suppressed. In addition, wildness can be suppressed which is caused by the movement of the upper part of the movable portion 2 in a direction other than the up-down direction that occurs due to the wear of the movable portion 2. Thus, coaxiality of the movable portion 2 can be improved. Moreover, the coaxiality indicates a deviation of an axial straight line from a specified axial straight line that the axial straight line should coincide with. Here, the specified axial straight line is the central axis J.

Figure 12:
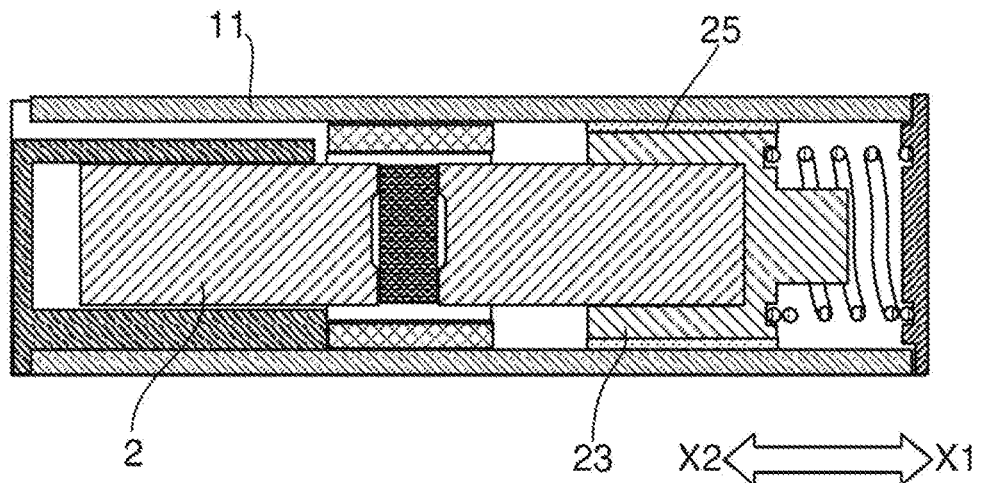
FIG. 12 is a side cross-sectional view of a vibration motor according to a sixth variation example.

FIG. 12 is a side cross-sectional view of a vibration motor 106 according to a sixth variation example. As shown in FIG. 12, in the vibration motor 106, the movable portion 2 has a second sliding member 25. The second sliding member 25 is disposed on an outer peripheral surface of the holder 23, and slides with respect to the inner surface of the housing 11. The same as the first sliding member 24, the second sliding member 25 is configured by, for example, a fluorine layer or the like.

According to this configuration, wildness can be suppressed which is caused by the movement of the upper part of the movable portion 2 in a direction other than the up-down direction, and coaxiality of the movable portion 2 can be improved. In addition, supposing that the second sliding member 25 is not arranged and the housing 11 is configured by a magnetic body, in order to suppress the movable portion 2 from being attracted and stuck by an attractive force to the housing 11 configured by the magnetic body, it is necessary to arrange a gap between the outer peripheral surface of the holder 23 and the inner surface of the housing 11 to a certain extent. Then, when the vibration motor is miniaturized, the size of the holder 23 serving as a weight is reduced. In contrast, if the embodiment is implemented, the second sliding member 25 is arranged, and thus even if the outer peripheral surface of the holder 23 is brought close to the inner surface of the housing 11, the movable portion 2 can be suppressed from being attracted and stuck, and the movable portion 2 can be stably operated. In addition, the size of the holder 23 serving as a weight can be increased even when the vibration motor 106 is miniaturized. Thus, vibration performance of the vibration motor 106 can be improved. Moreover, in the vibration motor 106, lubricant or a magnetic fluid may be disposed between the second sliding member 25 and the housing 11. That is, the lubricant or the magnetic fluid is disposed between a radial outer side surface of the second sliding member 25 and the housing 11. The lubricant is, for example, oil. Moreover, when the magnetic fluid is disposed, the magnetic fluid moves together with the second sliding member 25.

Figure 13:
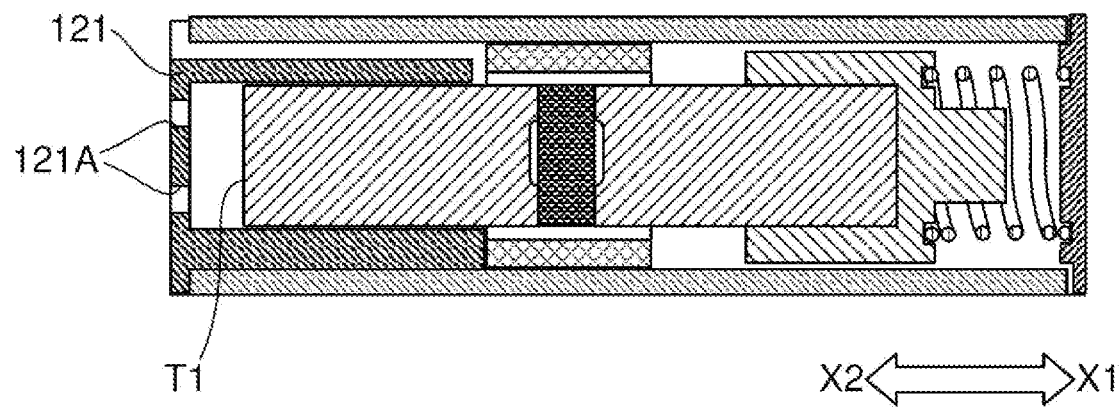
FIG. 13 is a side cross-sectional view of a vibration motor according to a seventh variation example.

FIG. 13 is a side cross-sectional view of a vibration motor 107 according to a seventh variation example. As shown in FIG. 13, in the vibration motor 107, the first lid portion 121 has through holes 121A penetrating in the up-down direction. A plurality of the through holes 121A are arranged. Moreover, the number of the through hole 121A may be one. That is, the first lid portion 121 has at least one through hole 121A penetrating in the up-down direction. In addition, the through holes 121A are disposed in an inner surface of the first lid portion 121 facing the bottom end surface T1 of the movable portion 2 in one direction.

According to this configuration, when the movable portion 2 moves in the up-down direction, the air escapes from the through holes 121A to the outside, and thus the movable portion 2 moves more easily.

Figure 14:
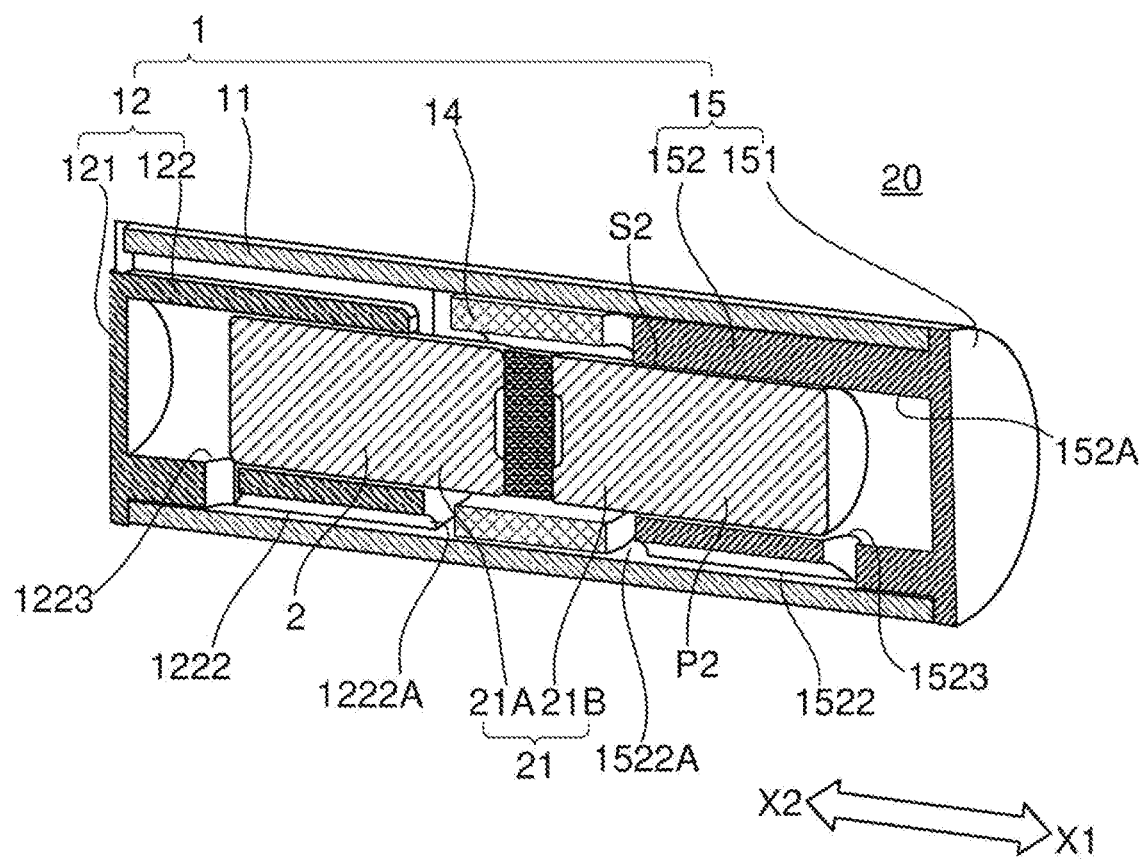
FIG. 14 is a cross-sectional perspective view of a vibration motor according to an illustrative second embodiment of the present disclosure.

Next, an illustrative second embodiment of the present disclosure is described. FIG. 14 is a cross-sectional perspective view of a vibration motor 20 according to the illustrative second embodiment of the present disclosure. The configuration of the vibration motor 20 is different from that of the vibration motor in the first embodiment in that the vibration motor 20 has a second sleeve bearing 15.

The stationary portion 1 has the second sleeve bearing 15. The second sleeve bearing 15 has a second lid portion 151 and a second bearing portion 152. That is, the stationary portion 1 has the second lid portion 151 and the second bearing portion 152.

The second lid portion 151 has a substantially disc-like shape. The second bearing portion 152 has a substantially circular cylindrical shape which protrudes downward from the second lid portion 151 and extends in the up-down direction. The second lid portion 151 and the second bearing portion 152 constitute the second sleeve bearing 15 which is a single member. Moreover, various variations in the configuration of the second sleeve bearing 15 are the same as those of the first sleeve bearing 12 described above.

The second sleeve bearing 15 is inserted into the housing 11 from above the housing 11 and is fixed to the housing 11. The second lid portion 151 blocks the upper end part of the housing 11. The second bearing portion 152 is disposed inside the housing 11 above the first bearing portion 122 and below the second lid portion 151.

The second sleeve bearing 15 is configured from, for example, a resin having low friction coefficient and low wear. The resin is, for example, POM (polyacetal).

The second bearing portion 152 has a bearing inner peripheral surface 152A having a circular cylindrical shape. In a case of the non-operating state, a part of the magnet portion 21B on the upper side is accommodated inside the second bearing portion 152 with a gap S2 from the bearing inner peripheral surface 152A. That is, the second bearing portion 152 has the bearing inner peripheral surface 152A which is disposed with the gap S2 from the outer peripheral surface of an upper part P2 of the movable portion 2. Moreover, FIG. 14 shows the vibration motor 20 in the non-operating state.

By energizing the coil 14, a driving force is applied to the magnet 21, and the movable portion 2 vibrates in the up-down direction. In a case in which the movable portion 2 is in contact with the bearing inner peripheral surfaces 122A and 152A when the movable portion 2 vibrates, the movable portion 2 slides with respect to the first bearing portion 122 and the second bearing portion 152 that are stationary, and thus the movement of the movable portion 2 is nearly restricted to movement in the up-down direction. Accordingly, the movement of the movable portion 2 is stabilized. Furthermore, when the housing 11 is configured by a magnetic body, the sticking of the movable portion 2 can be suppressed, and the movable portion 2 can be stably operated.

In addition, when the movable portion 2 moves upward, the air which is accommodated in a space surrounded by the second bearing portion 152 and the second lid portion 151 is pressed by the movable portion 2, and thereby effect of damper is exerted, and the movable portion 2 can be suppressed from coming into contact with the second lid portion 151.

Furthermore, in the embodiment, compared with the first embodiment, because the holder and the elastic member are replaced by the bearing portion, costs can be further reduced.

Moreover, in the configuration shown in FIG. 14, the first bearing portion 122 has the air passage 1222 and the air hole 1223, and the second bearing portion 152 has an air passage 1522 and an air hole 1523.

The air passage 1222 extends upward from the air hole 1223 to the upper end surface of the first bearing portion 122 and is open. That is, an upper end 1222A of the air passage 1222 is positioned on the upper end surface of the first bearing portion 122.

Accordingly, when the movable portion 2 moves downward, the air pressed by the movable portion 2 flows into the air passage 1222 via the air hole 1223, and flows to the outside from the upper end 1222A. Thus, the air escapes more easily, and the movable portion 2 moves downward more easily.

The air passage 1522 extends downward from the air hole 1523 to a bottom end surface of the second bearing portion 152 and is open. That is, a bottom end 1522A of the air passage 1522 is positioned on the bottom end surface of the second bearing portion 152.

Accordingly, when the movable portion 2 moves upward, the air pressed by the movable portion 2 flows into the air passage 1522 via the air hole 1523, and flows to the outside from the bottom end 1522A. Thus, the air escapes more easily, and the movable portion 2 moves upward more easily. Moreover, if the movable portion 2 moves upward beyond the air hole 1523, the air hole 1523 is blocked, and thus effect of damper can be strengthened, and a distance between the movable portion 2 and the second lid portion 151 in the first direction can be appropriately maintained.

Moreover, various variation examples of the first embodiment described above can be appropriately applied in the embodiment.

Figure 15:
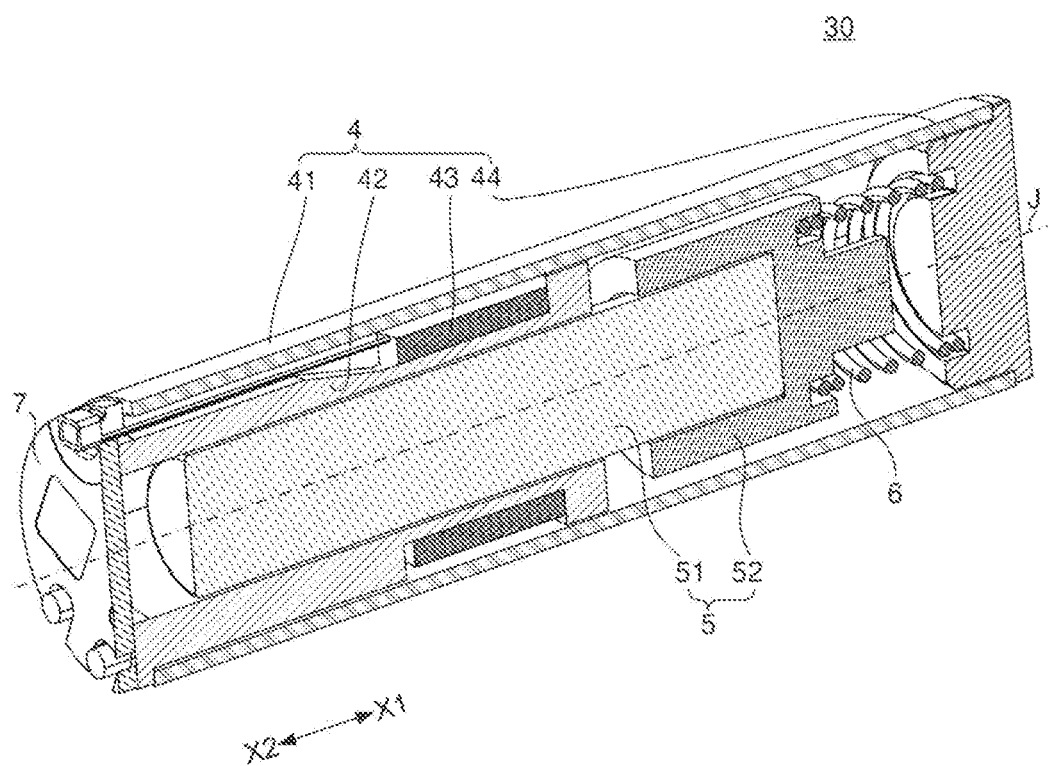
FIG. 15 is a longitudinal cross-sectional perspective view of a vibration motor according to an illustrative third embodiment of the present disclosure.
Figure 16:
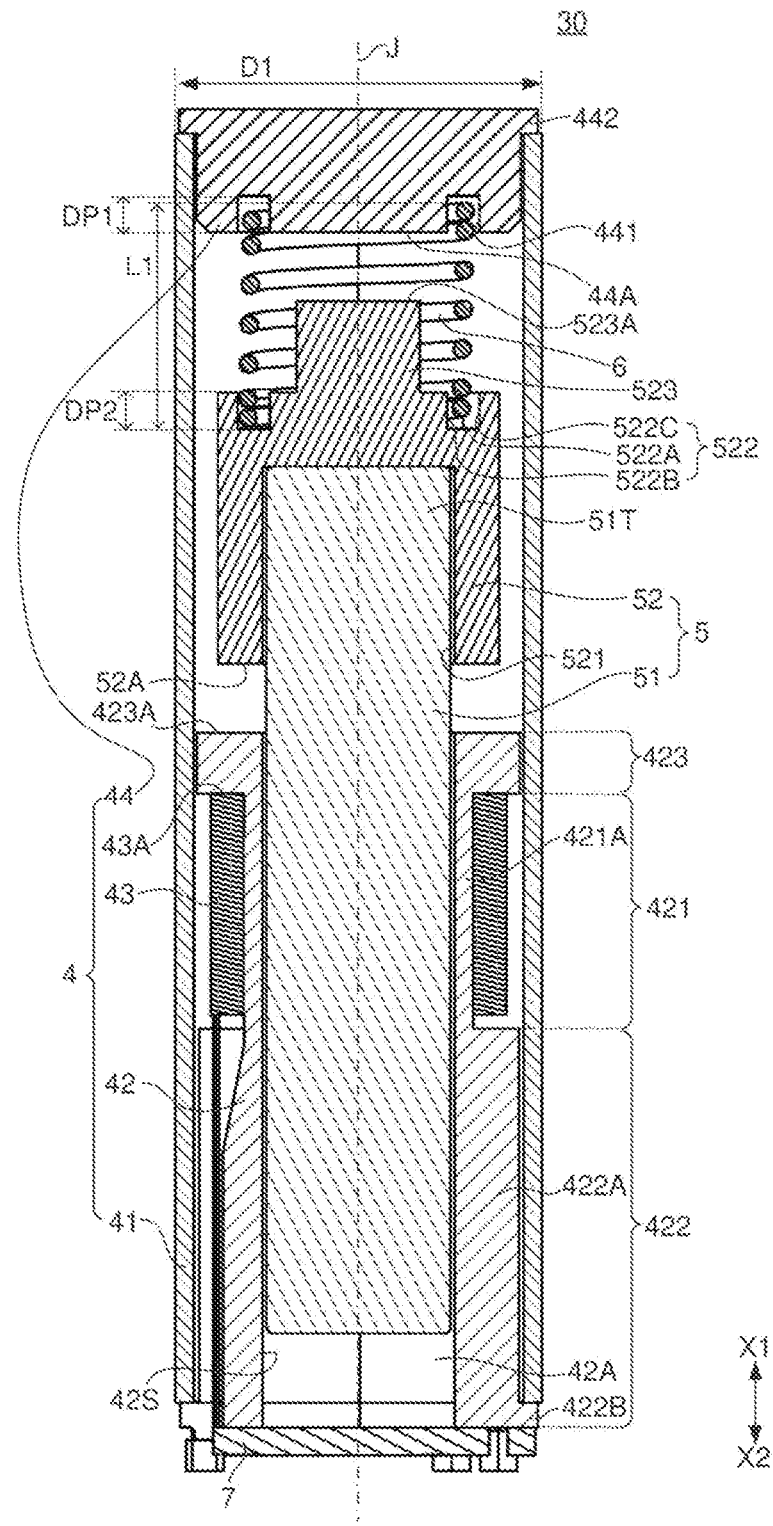
FIG. 16 is a longitudinal cross-sectional view of the vibration motor according to the illustrative third embodiment of the present disclosure.

FIG. 15 is a longitudinal cross-sectional perspective view of a vibration motor 30 according to an illustrative third embodiment of the present disclosure. FIG. 16 is a longitudinal cross-sectional view of the vibration motor 30 shown in FIG. 15.

The vibration motor 30 includes a stationary portion 4 and a movable portion 5. In the embodiment, the vibration motor 30 further has an elastic member 6 and a substrate 7. The movable portion 5 extends along a direction of the central axis J. The movable portion 5 can vibrate with respect to the stationary portion 4 along the central axis J. The central axis J extends in the up-down direction. That is, the movable portion 5 can vibrate in the up-down direction.

The stationary portion 4 has a housing 41, a bearing portion 42, and a coil 43. In the embodiment, the stationary portion 4 further has a top surface portion 44.

The housing 41 is a circular cylindrical member extending in the up-down direction. Moreover, the housing 41 is not limited to the circular cylindrical shape and may have, for example, a square cylindrical shape or the like. That is, the housing 41 may have a cylindrical shape extending in the up-down direction. The housing 41 is configured by a magnetic body. The magnetic body is, for example, stainless steel. The housing 41 accommodates the movable portion 5 and the coil 43 inside.

The bearing portion 42 is a cylindrical sleeve bearing extending along the central axis J. The bearing portion 42 is configured from, for example, a resin with a low friction coefficient and low wear. The resin is, for example, a liquid crystal polymer (LCP).

The bearing portion 42 has a hollow portion 42A which has a circular columnar shape extending in the up-down direction. The bearing portion 42 has a first region portion 421, a second region portion 422, and a third region portion 423. The second region portion 422 is disposed below the first region portion 421. That is, the bearing portion 42 has the second region portion 422 disposed below the first region portion 421. The third region portion 423 is disposed above the first region portion 421. An inner diameter of each of the first region portion 421, the second region portion 422, and the third region portion 423 is substantially the same. Accordingly, the hollow portion 42A is configured which has a diameter substantially constant in the up-down direction.

The first region portion 421, the second region portion 422, and the third region portion 423 are integrally formed. The first region portion 421 has a circular cylindrical shape extending in the up-down direction. On a radial outer periphery of the first region portion 421, a conducting wire is wound and the coil 43 is formed. The coil 43 is formed in a way that the conducting wire is wound around the central axis J. A radial inner side surface of the coil 43 is in contact with a radial outer side surface of the first region portion 421. That is, the bearing portion 42 has the first region portion 421, and the first region portion 421 has a coil inner region portion 421A disposed radially inside the coil 43.

A radial outer end position of the first region portion 421 coincides with a radial inner end position of the coil 43. Accordingly, during the manufacture of the vibration motor 30, the coil 43 can be wound around the first region portion 421 after the bearing portion 42 is formed, and thus mass-productivity of the vibration motor 30 is improved.

The second region portion 422 has a base portion 422A having a circular cylindrical shape extending in the up-down direction, and a third protrusion portion 422B which protrudes radially outward from a bottom end part of the base portion 422A. That is, the second region portion 422 has the third protrusion portion 422B protruding radially outward. The third protrusion portion 422B has an annular shape. During the manufacture of the vibration motor 30, the bearing portion 42 is inserted into the housing 41 from below. By the insertion, an upper surface of the third protrusion portion 422B is in contact with a bottom surface of the housing 41 in the up-down direction. Accordingly, the positioning of the bearing portion 42 with respect to the housing 41 in the up-down direction can be performed.

The bearing portion 42 is disposed inside the housing 41. In a state in which the bearing portion 42 is accommodated inside the housing 41, the housing 41 is disposed radially outside from a radial outer end of the coil 43. That is, the stationary portion 4 has the housing 41 disposed radially outside from the radial outer end of the coil 43 and having a cylindrical shape which extends in the up-down direction.

A radial outer side surface of the base portion 422A is disposed radially outside from a radial outer side surface of the coil 43. That is, a radial outer side surface of the second region portion 422 is disposed radially outside from the radial outer side surface of the first region portion 421. An upper surface of the second region portion 422 is disposed facing a bottom end of the coil 43 in the up-down direction. Accordingly, the coil 43 can be suppressed from moving lower than the upper surface of the second region portion 422.

The third region portion 423 has a circular cylindrical shape extending in the up-down direction. A radial outer end of the third region portion 423 is disposed radially outside from a radial inner end of the coil 43. A bottom surface of the third region portion 423 is disposed facing an upper end of the coil 43 in the up-down direction. The third region portion 423 is a flange portion. Accordingly, the coil 43 can be suppressed from moving higher than the bottom surface of the third region portion 423.

The movable portion 5 has a core portion 51 and a holder 52.

The core portion 51 is a circular columnar member extending along the direction of the central axis J. In the embodiment, the core portion 51 has, for example, two magnets lined up in the up-down direction, and a magnetic body which is disposed in a way of being clamped between the magnets in the up-down direction. That is, the movable portion 5 has the magnets and the magnetic body. In this case, for example, a lower part of the upper magnet is an N-pole, and an upper part of the upper magnet is an S-pole. An upper part of the lower magnet is an N-pole, and a lower part of the lower magnet is an S-pole. That is, the N-poles face each other in the up-down direction with the magnetic body therebetween. The housing 41 is configured by a magnetic body, and thereby a magnetic field generated by the magnets and the coil 43 can be suppressed from leaking to the outside of the vibration motor 30, and a magnetic force can be increased. Moreover, the magnetic poles of each magnet described above may be set to be opposite to the above in the up-down direction.

The holder 52 holds an upper end part 51T of the core portion 51. The holder 52 has a columnar recessed portion 521 which is recessed upward in a circular columnar shape. The upper end part 51T is disposed inside the columnar recessed portion 521. The upper end part 51T is fixed to the columnar recessed portion 521 by, for example, adhesion. That is, the holder 52 is fixed to the core portion 51. The movable portion 5 has the holder 52 disposed above the magnets and holding the magnets.

The holder 52 functions as a weight and is configured by, for example, metal. An example of this metal is a tungsten alloy.

The holder 52 has an accommodation portion 522. That is, the movable portion 5 has the accommodation portion 522. The accommodation portion 522 is recessed downward from an upper surface of the holder 52 in an annular shape. More specifically, the accommodation portion 522 has an upper surface 522A of the movable portion 5 (the holder 52), a wall surface 522B extending upward from an inner edge of the upper surface 522A, and a wall surface 522C extending upward from an outer edge of the upper surface 522A. That is, the accommodation portion 522 has the upper surface 522A of the movable portion 5, and the wall surfaces 522B and 522C extending upward from at least one of the inner edge of the upper surface 522A and the outer edge of the upper surface 522A.

A bottom end part of the elastic member 6 is accommodated in the accommodation portion 522. The fixing of the elastic member 6 to the accommodation portion 522 is performed by, for example, adhesion. That is, the bottom end part of the elastic member 6 is accommodated and fixed in the accommodation portion 522. By the accommodation portion 522, the elastic member 6 can be positioned and firmly fixed in the movable portion 5. In addition, because the accommodation portion 522 is arranged in the holder 52 rather than on the magnet, the accommodation portion 522 having less influence on magnetic characteristics can be formed.

The stationary portion 4 has the top surface portion 44. The top surface portion 44 is a substantially disc-like member centering on the central axis J. The top surface portion 44 is disposed above the movable portion 5, and extends in a direction intersecting with the up-down direction. The top surface portion 44 has a first recessed portion 441 which is recessed upward from a bottom surface in an annular shape. That is, the top surface portion 44 has the first recessed portion 441 which is recessed upward. An upper end part of the elastic member 6 is accommodated and fixed in the first recessed portion 441. Accordingly, the elastic member 6 can be positioned and firmly fixed in the top surface portion 44.

The fixing of the elastic member 6 to the first recessed portion 441 is performed by, for example, adhesion. That is, the upper end part of the elastic member 6 is fixed by an adhesive agent accommodated inside the first recessed portion 441. Therefore, firm fixing can be realized by an easy method.

The top surface portion 44 has a flange portion 442 protruding in the radial direction. During the manufacture of the vibration motor 30, the top surface portion 44 is inserted into the housing 41 from above. At this time, a bottom surface of the flange portion 442 is in contact with an upper surface of the housing 41 in the up-down direction. Accordingly, the positioning of the top surface portion 44 with respect to the housing 41 in the up-down direction can be performed, and strength improvement of the vibration motor 30 can be achieved.

According to this configuration, the movable portion 5 is supported by the top surface portion 44 via the elastic member 6. In a state in which the elastic member 6 has a natural length, as shown in FIG. 16, a part of the core portion 51 on the lower side is accommodated inside the hollow portion 42A of the bearing portion 42. Accordingly, the core portion 51 is supported by the bearing portion 42 in a way of being capable of vibrating along the central axis J. That is, the bearing portion 42 supports the movable portion 5 in a way that the movable portion 5 can vibrate along the central axis J. That is, the bearing portion 42 extends along the central axis J, and supports the movable portion 5 in a way that the movable portion 5 can vibrate along the central axis J.

The elastic member 6 is fixed to both the top surface portion 44 and the movable portion 5 (the holder 52), and thus the vibration of the movable portion 5 is stabilized.

In a state in which a part of the core portion 51 is accommodated inside the bearing portion 42, a bearing inner side surface 42S of the bearing portion 42 faces a radial outer side surface of the core portion 51 in the radial direction. The bearing inner side surface 42S is an outer peripheral surface of the hollow portion 42A. That is, the bearing portion 42 has the bearing inner side surface 42S which is disposed facing a radial outer side surface of the movable portion 5 in the radial direction. In a case in which the movable portion 5 is in contact with the bearing inner side surface 42S of the bearing portion 42 when the movable portion 5 vibrates, the movable portion 5 slides with respect to the bearing portion 42 that is stationary, and thus the movement of the movable portion 5 is restricted to movement in the up-down direction. Accordingly, a phenomenon can be suppressed in which the movable portion 5 is attracted and stuck by an attractive force to the housing 41 configured by a magnetic body, and the movable portion 5 can be stably operated.

In addition, the lower part of the movable portion 5 is supported by the bearing portion 42, but is not supported in the up-down direction. Accordingly, compared with a case in which the movable portion is supported from both sides in the up-down direction by elastic members or the like, resilience of the movable portion in the up-down direction can be suppressed from becoming greater than necessary. Thus, the vibration of the movable portion in the up-down direction can be increased. In addition, there is no need to dispose an elastic member below the movable portion 5, and thus the configuration of the vibration motor 30 becomes simple, and mass-productivity is improved. In addition, due to the cantilever configuration in which this movable portion 5 is supported by the elastic member 6, it is important that the elastic member 6 is fixed to both the top surface portion 44 and the movable portion 5.

By energizing the coil 43, a magnetic field is generated from the coil 43. By the interaction between the generated magnetic field and a magnetic field which is generated by the core portion 51, the movable portion 5 vibrates in the up-down direction. That is, the coil 43 can apply a driving force to the magnets by the energization.

The first region portion 421 has the coil inner region portion 421A, and thereby the movable portion 5 and the coil 43 can be separated by the coil inner region portion 421A. Accordingly, a thickness in the radial direction of the coil inner region portion 421A can be reduced, and the vibration motor 30 can be miniaturized in the radial direction.

In addition, the second region portion 422 is disposed below the bottom end of the coil 43. Thus, by arranging the second region portion 422 in the bearing portion 42 in addition to the first region portion 421, a length in the up-down direction of the inner side surface of the bearing portion 42 facing the movable portion 5 in the radial direction becomes longer, and inclination during the vibration of the movable portion 5 can be suppressed. Accordingly, the vibration of the vibration motor 30 is stabilized.

In addition, as shown in FIG. 16, a part of the movable portion 5 is disposed on the radial inner side of each of a radial inner side surface of the first region portion 421 and a radial inner side surface of the second region portion 422. More specifically, in a state in which the elastic member 6 has a natural length, a part of the movable portion 5 is disposed on the radial inner side of each of the radial inner side surface of the first region portion 421 and the radial inner side surface of the second region portion 422. Accordingly, a length in the up-down direction of the movable portion 5 facing an inner side surface of the bearing portion 42 in the radial direction becomes longer, and the inclination during the vibration of the movable portion 5 can be suppressed. Thus, the vibration can be stabilized. Moreover, in a state in which the elastic member 6 has a natural length, a part of the movable portion 5 may not be positioned radially inside of the second region portion 422.

In addition, the bearing portion 42 has the third region portion 423 which is disposed above the first region portion 421. Accordingly, the length in the up-down direction of the inner side surface of the bearing portion 42 facing the movable portion 5 in the radial direction becomes longer, and the inclination during the vibration of the movable portion 5 can be further suppressed. Moreover, the radial outer end of the third region portion 423 is disposed radially inside from the radial inner end of the coil 43.

In addition, a bottom surface 52A of the holder 52 is disposed directly facing an upper surface 423A of the third region portion 423 in the up-down direction. That is, the movable portion 5 has the bottom surface 52A which is disposed directly facing the upper surface 423A of the third region portion 423 in the up-down direction. Accordingly, the bottom surface 52A of the movable portion 5 can be in contact with the upper surface 423A of the third region portion 423, and the downward movement of the movable portion 5 can be restricted. Particularly, because an inner diameter of the second region portion 422 is substantially constant in the up-down direction, the downward movement of the movable portion 5 is restricted as described above, and thereby the movable portion 5 can be suppressed from moving downward from the second region portion 422. In addition, as described later, when the substrate 7 is disposed below the second region portion 422, a gap between the movable portion 5 and the substrate 7 in the up-down direction can be appropriately maintained.

In addition, as shown in FIG. 16, the holder 52 has a protruding portion 523 protruding upward. An upper surface 523A of the protruding portion 523, that is, of the holder 52 is disposed directly facing a bottom surface 44A of the top surface portion 44 in the up-down direction. Accordingly, the upper surface 523A of the holder 52 can be in contact with the bottom surface 44A of the top surface portion 44, and the upward movement of the movable portion 5 can be restricted.

In addition, as shown in FIG. 16, an upper surface 43A of the coil 43 is disposed facing the bottom surface 52A of the holder 52 in the up-down direction. Accordingly, compared with a case in which the entire upper surface 43A of the coil 43 is disposed radially outside from the bottom surface 52A of the holder 52, a size of the vibration motor 30 in the radial direction can be reduced.

In addition, as shown in FIG. 16, a radial outer end of the elastic member 6 is disposed radially outside from the radial outer end surface of the magnet. Accordingly, the elastic member 6 is fixed to the movable portion 5 as radially outward as possible, and thus the vibration of the movable portion 5 is further stabilized.

In addition, in the embodiment, the movable portion 5 only includes the core portion 51 including the magnets, the holder 52, and an adhesive agent for fixing the magnets and the holder 52. Accordingly, the movable portion 5 which is firm can be achieved by a simple configuration.

Figure 17:
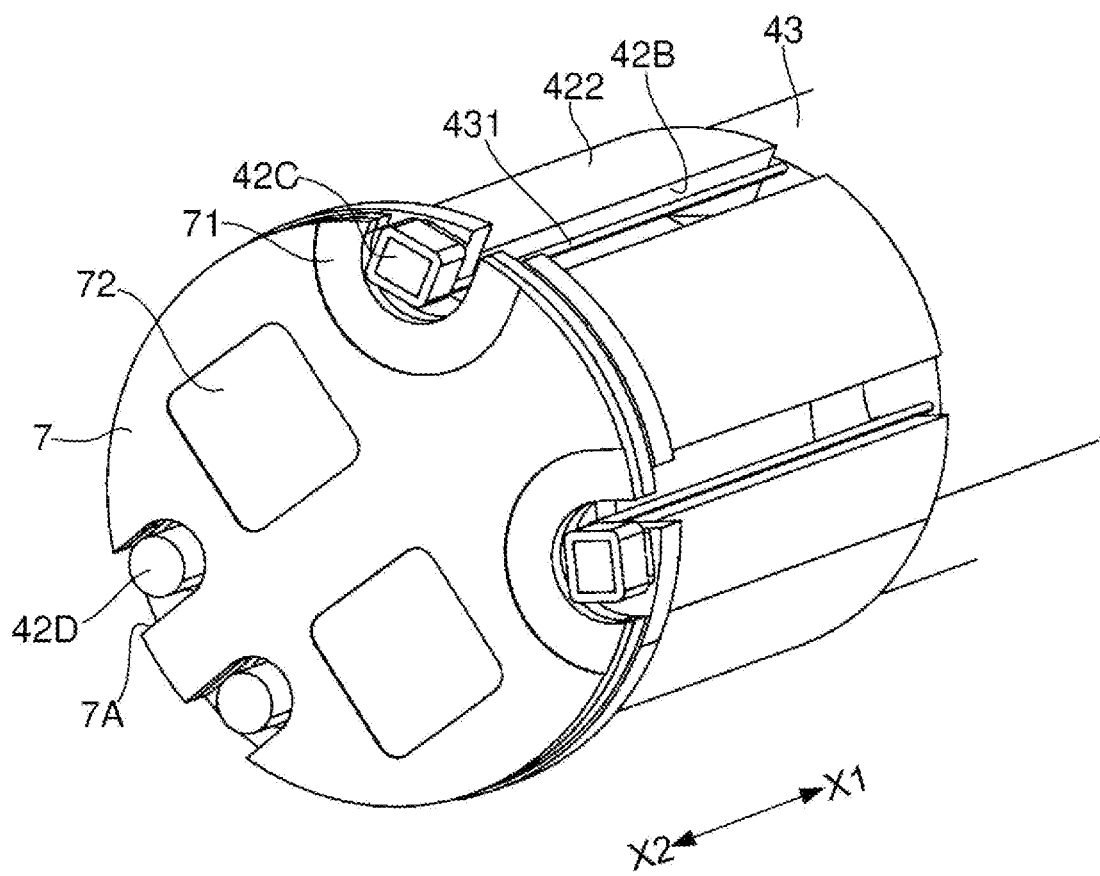
FIG. 17 is a perspective view showing a configuration related to electrical connection between a substrate and a coil.

FIG. 17 is a perspective view showing a configuration related to the electrical connection between the substrate 7 and the coil 43. As shown in FIG. 17, on the radial outer side surface of the second region portion 422, a recessed portion 42B is formed which extends in the up-down direction and is recessed radially inward. A part of an extracted wire 431 which is extracted from the coil 43 is accommodated in the recessed portion 42B. Moreover, the entire extracted wire 431 may be accommodated in the recessed portion 42B.

That is, at least a part of the extracted wire 431 may be accommodated in the recessed portion 42B.

Accordingly, the extracted wire 431 is not required to be routed radially outside the bearing portion 42. Thus, compared with a case in which the extracted wire 431 is routed radially outside the bearing portion 42, the extracted wire 431 can be suppressed form interfering with other parts or other members in the vibration motor 30, and the vibration motor 30 can be miniaturized in the radial direction. In addition, manufacturing efficiency of the vibration motor 30 is improved.

In addition, as shown in FIG. 17, the substrate 7 is disposed below the second region portion 422 and extends in the radial direction. The substrate 7 may be a flexible printed substrate or may be a rigid printed substrate.

The bearing portion 42 has a first protrusion portion 42C which protrudes downward from a bottom surface of the second region portion 422. A bottom end part of the extracted wire 431 extracted downward is wound around the first protrusion portion 42C. That is, the extracted wire 431 is wrapped around the first protrusion portion 42C.

The substrate 7 has a first electrode portion 71 and a second electrode portion 72. The first electrode portion 71 and the second electrode portion 72 are electrically connected by a wiring pattern inside the substrate 7 (not shown in FIG. 17). During the manufacture of the vibration motor 30, work may be performed in which the substrate 7 is attached to the second region portion 422, and the first electrode portion 71 and the extracted wire 431 which is wrapped around the first protrusion portion 42C are electrically connected by soldering or the like. This work may be performed automatically or manually. Thus, compared with a case in which the extracted wire is directly connected to the substrate, the manufacture of the vibration motor 30 can be performed with better workability. In addition, by a mechanism for wrapping the extracted wire 431 around the first protrusion portion 42C, reliability of the electrical connection between the extracted wire and the substrate 7 is improved even when an outer diameter of the extracted wire is small. Thus, regardless of whether the outer diameter of the extracted wire is small or great, the reliability of the electrical connection between the extracted wire and the substrate is improved, and thus the outer diameter of the extracted wire can be adjusted according to the use of the vibration motor, and electrical resistance and output characteristics of the coil 43 are adjusted more easily.

In this way, the bottom end part of the extracted wire 431 extracted downward from the coil 43 is electrically connected to the substrate 7. Accordingly, the extracted wire 431 used for electrically connecting the coil 43 and the substrate 7 can be easily routed.

In addition, the substrate 7 has a plurality of notch portions 7A which are recessed in a direction approaching the central axis J from the radial outer edge of the substrate 7. The bearing portion 42 has a plurality of second protrusion portions 42D which protrude downward from the bottom surface of the second region portion 422. The plurality of second protrusion portions 42D are accommodated in the plurality of notch portions 7A. Accordingly, the positioning of the substrate 7 can be performed.

Figure 18:
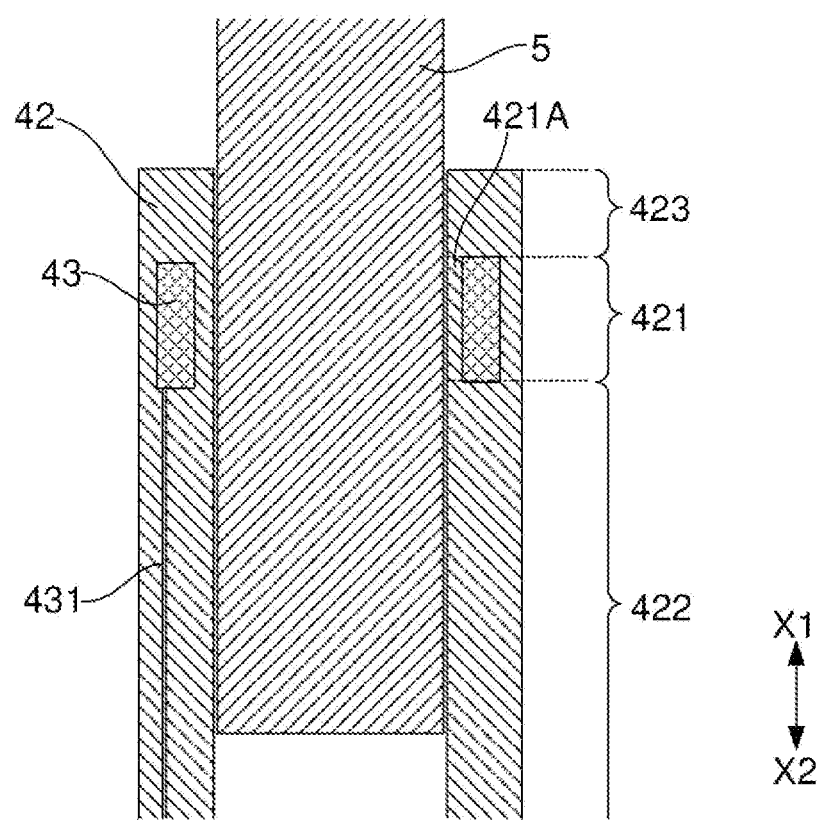
FIG. 18 is a longitudinal cross-sectional view showing a partial configuration of a bearing portion according to a variation example.

FIG. 18 is a diagram showing a partial configuration of the bearing portion 42 according to a variation example. In the variation example shown in FIG. 18, the whole coil 43 is disposed inside the first region portion 421 and is integrally formed with the first region portion 421. The coil inner region portion 421A is a part of the first region portion 421. Moreover, a part of the coil 43 may be disposed inside the first region portion 421. That is, at least a part of the coil 43 may be disposed inside the first region portion 421 and integrally formed with the first region portion 421. Accordingly, the coil 43 can be firmly fixed to the bearing portion 42.

In addition, in the configuration shown in FIG. 18, the extracted wire 431 extracted from the coil 43 is disposed inside the second region portion 422 and is integrally formed with the second region portion 422. Accordingly, the extracted wire 431 can be firmly fixed to the bearing portion 42.

The configuration shown in FIG. 18 can be formed by insert molding.

Figure 19:
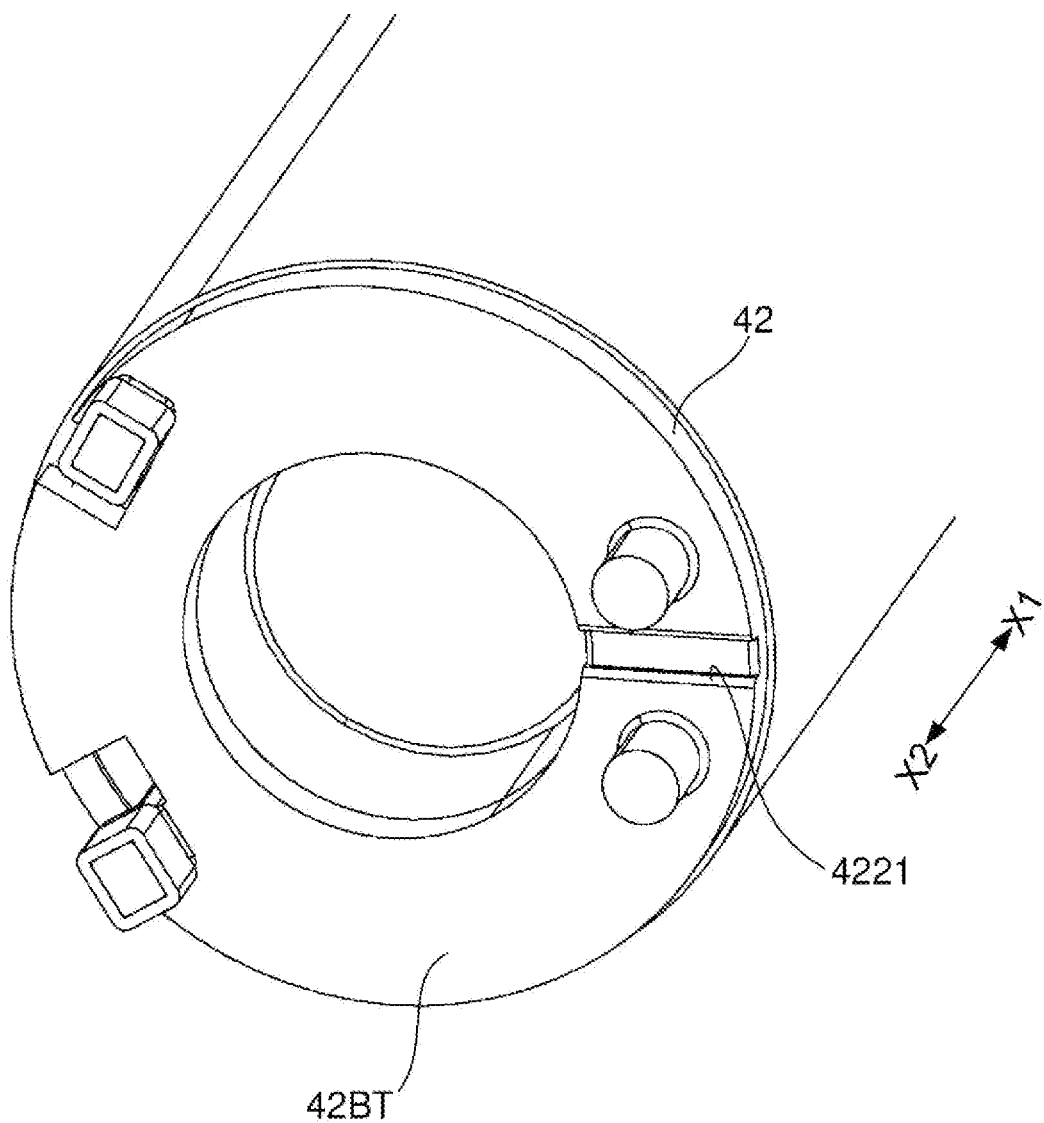
FIG. 19 is a perspective view showing a bottom end part of a bearing portion according to another variation example.

FIG. 19 is a perspective view showing a bottom end part 42BT of the bearing portion 42 according to another variation example. FIG. 19 is a diagram of a state in which the substrate 7 is removed. The bottom end part 42BT of the bearing portion 42 is equivalent to a bottom end part of the second region portion 422.

As shown in FIG. 19, in the bottom end part 42BT, a communication portion 4221 is formed which has a groove-like shape extending in the radial direction and recessed upward from a bottom surface of the bearing portion 42. The communication portion 4221 communicates a radially inner space and a radially outer space of the bottom end part 42BT. That is, the bearing portion 42 has the communication portion 4221 which communicates the internal space of the bearing portion 42 and the external space of the bearing portion 42. Accordingly, when the movable portion 5 vibrates in the up-down direction, a gas inside the bearing portion 42 is discharged to the outside of the bearing portion 42 through the communication portion 4221, and thus the gas inside the bearing portion 42 can be suppressed from being compressed and an amplitude of vibration can be suppressed from reducing. In addition, in the configuration in which the substrate 7 is disposed below the bearing portion 42 as described in the embodiment, the configuration is particularly useful in which the communication portion 4221 is arranged and the gas inside the bearing portion 42 is discharged to the outside of the bearing portion 42.

Moreover, the communication portion 4221 is not limited to the groove-like shape and may be formed as, for example, a through hole penetrating through the bearing portion 42 in the radial direction.

Figure 20:
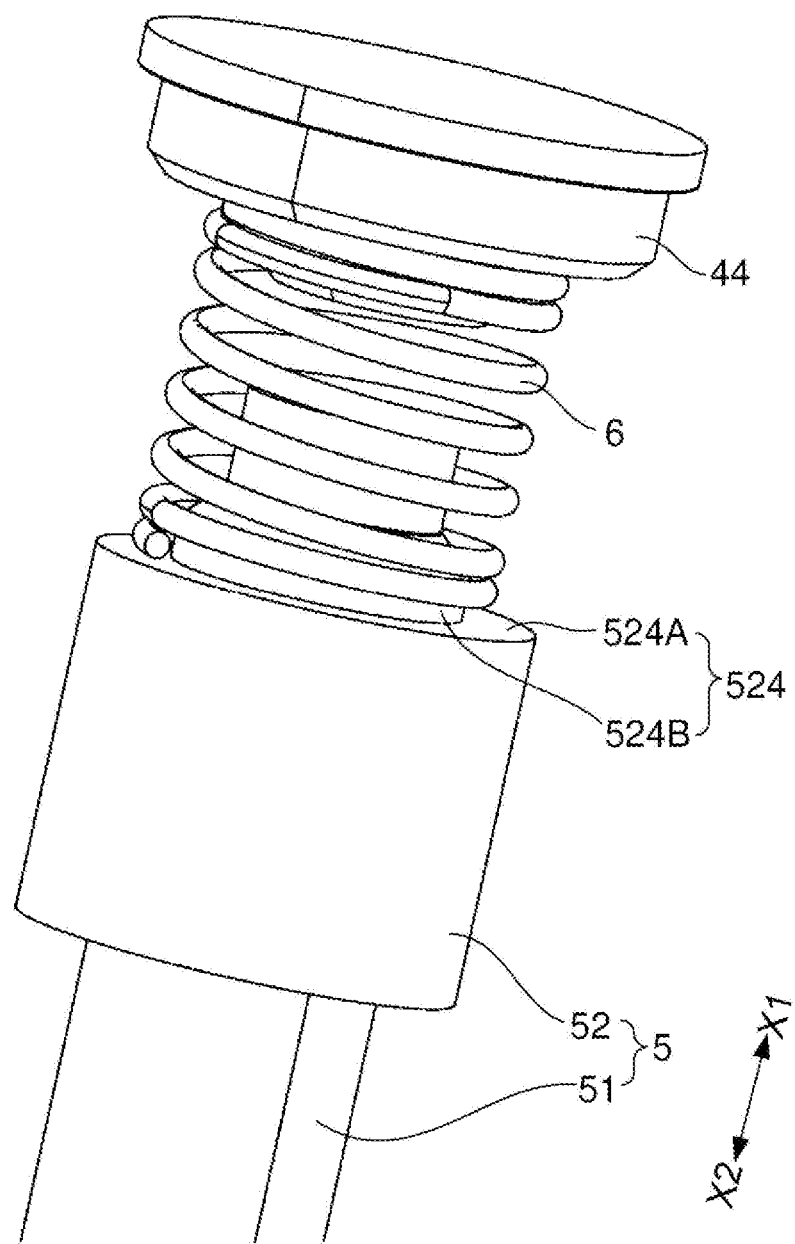
FIG. 20 is a perspective view showing a variation example of a holder.

FIG. 20 is a perspective view showing a variation example of the holder 52. The holder 52 according to the variation example shown in FIG. 20 has an accommodation portion 524, instead of the accommodation portion 522 in the embodiment described above (FIG. 16). The accommodation portion 524 has an upper surface 524A having an annular shape centering on the central axis J, and a wall surface 524B extending upward from the radial inner edge of the upper surface 524A. That is, the accommodation portion 524 has the wall surface 524B extending upward from only the inner edge of the inner edge and the outer edge of the upper surface 524A. The accommodation portion 524 is equivalent to a configuration in which a radial outer wall surface is not arranged in the accommodation portion 522 (FIG. 16) that is recessed in an annular shape.

The bottom end part of the elastic member 6 is fixed by an adhesive agent accommodated in the accommodation portion 524. According to the configuration of the accommodation portion 524, even when sizes of the movable portion 5 and the elastic member 6 is small, the adhesive agent is injected into the accommodation portion 524 more easily.

Moreover, an outer diameter D1 (FIG. 16) of the housing 41 is preferably 4 mm or less. For example, D1=3 mm. That is, the housing 41 preferably has a circular cylindrical shape having an outer diameter of 4 mm or less. Particularly, when the vibration motor is mounted on an electronic pen, an outer diameter of the electronic pen is required to be set to have a size that fits in the size of a human hand in a state where the vibration motor is mounted on the electronic pen, and thus it is important to reduce an outer diameter of the vibration motor. Therein, by setting the outer diameter of the vibration motor to be 10 mm or less in a thick electronic pen, and setting the outer diameter of the vibration motor to be 4 mm or less in a thin electronic pen, the vibration motor can be mounted on electronic pens having various shapes. When the housing has a shape other than a circular cylindrical shape, a long side of an outer edge of the housing on a surface perpendicular to the first direction is preferably 4 mm or less. In addition, a length L1 (FIG. 16) of the elastic member 6 in the up-down direction is preferably 3 mm or less. Moreover, the length L1 of the elastic member 6 in the up-down direction is a length when the elastic member 6 has a natural length. For example, L1=1.9 mm. Accordingly, a stable vibration can be generated in the vibration motor 30 having a small size.

In addition, a depth DP1 (FIG. 16) of the first recessed portion 441 in the up-down direction or a depth DP2 (FIG. 16) of the accommodation portion 522 in the up-down direction is preferably 0.1 mm or more and is 0.5 mm or less. Accordingly, the fixing of the elastic member 6 can be strengthened in the vibration motor 30 having a small size.

Figure 21:
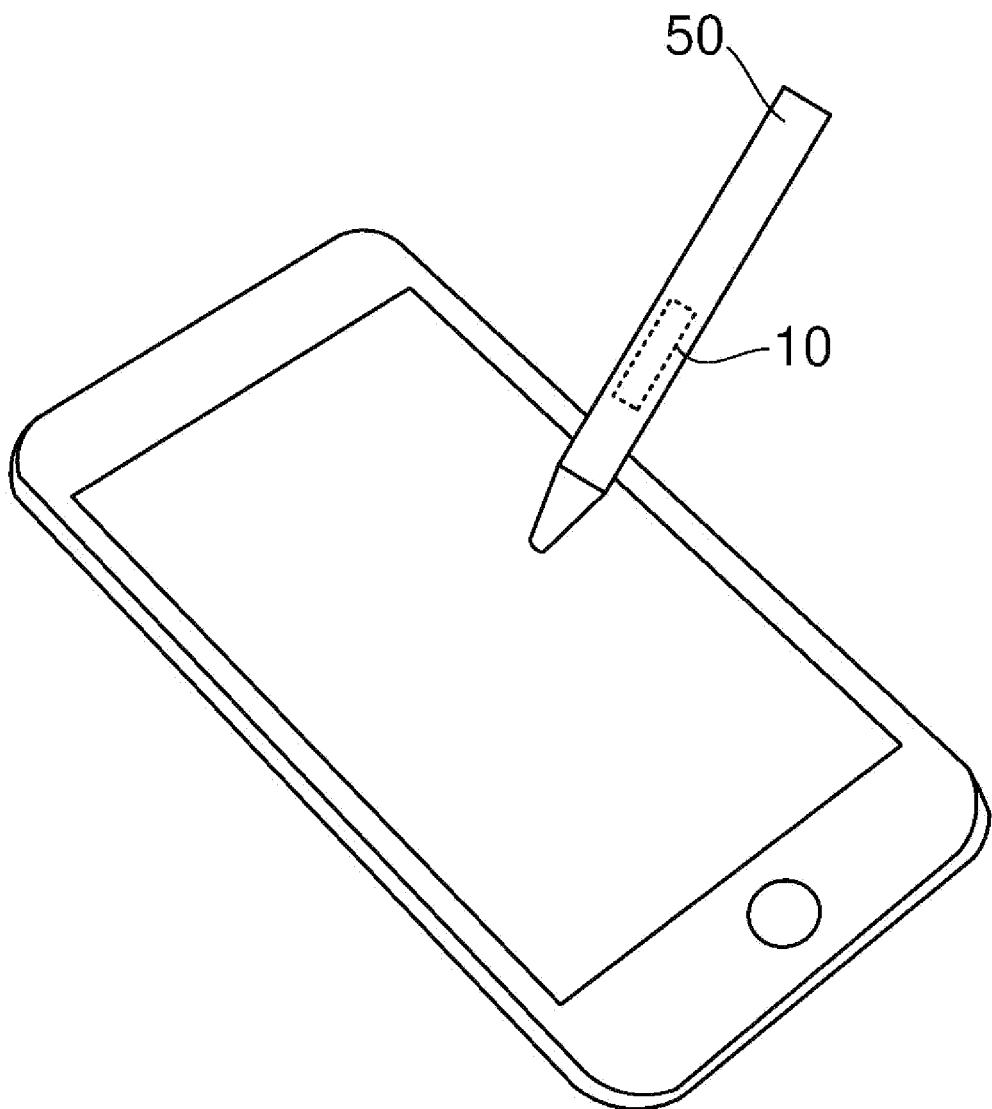
FIG. 21 is a diagram schematically showing a touch pen on which a vibration motor is mounted.

FIG. 21 is a diagram schematically showing a touch pen 50 which is taken as an example of an instrument to be equipped with the vibration motor 10. The touch pen 50 is an apparatus for operating an instrument by coming into contact with a touch panel of the instrument such as a smartphone, a tablet, or the like. By mounting the vibration motor 10 on the touch pen 50, the touch pen 50 can be vibrated to give the user a tactile feedback. That is, the touch pen 50 is an example of a tactile device having the vibration motor 10. That is, the tactile device has the vibration motor 10. For example, by the tactile feedback, the user can be given a feeling of writing characters or the like on paper or the like by using the touch pen 50. By mounting the vibration motor 10 on the tactile device, a stable tactile feedback can be achieved.

In addition, the vibration motor 10 can be mounted on various instruments such as an air operation device and the like, not limited to the touch pen. For example, the vibration motor 10 is mounted on an instrument such as an electronic pen, an electronic writing implement, a mouse, or the like to make this instrument serve as an electronic instrument capable of inputting a three-dimensional image or a virtual-reality image.

Moreover, vibration motors of various embodiments other than the vibration motor 10 are also the same for the instrument to be mounted.

The present disclosure can be used for, for example, the vibration motor mounted on various instruments such as a portable instrument and the like.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A vibration motor, comprising:
a stationary portion;
a movable portion which comprises a magnet and a holder, wherein the movable portion is capable of vibrating with respect to the stationary portion along a central axis extending in an up-down direction,
wherein the holder has a columnar recessed portion,
wherein an upper end part of the magnet is fitted to the columnar recessed portion which covers a lateral side surface of the upper end part of the magnet, and
wherein the stationary portion comprises:
a housing which is disposed radially outside from the movable portion and extending along the central axis;
a top surface portion which is disposed above the movable portion, is fixed to the housing, and extends in a direction intersecting with the central axis; and
a coil which is capable of applying a driving force to the movable portion, and
a bearing portion that extends along the central axis,
wherein an inner surface of the bearing portion radially faces more than a half length of the movable portion along the up-down direction and less than an entire length of the movable portion along the up-down direction.

2. The vibration motor according to claim 1, wherein the stationary portion further comprises a first bearing portion, wherein an inner circumferential surface of the first bearing portion comprises at least one groove portion laterally extending along one direction.

3. The vibration motor according to claim 1, wherein an upper end of a groove portion is aligned with an inner surface of the first bearing portion extending along the one direction.

4. The vibration motor according to claim 1, wherein the bearing portion has a first lid portion and a first bearing portion, wherein the first lid portion has at least one through hole penetrating in the up-down direction.

5. The vibration motor according to claim 1, wherein the stationary portion comprises:
a first bearing portion;
a second lid portion which is disposed close to an end portion of the housing extending along one direction; and
a second bearing portion,
wherein the second bearing portion is disposed sequentially between the first bearing portion and the second lid portion along one direction, and
the second bearing portion comprises an inner circumferential surface, and a gap is disposed between the inner circumferential surface of the second bearing portion and an outer circumferential surface of a portion of the movable portion extending along the one direction.

6. The vibration motor according to claim 1, wherein the bearing portion comprises a first region portion, wherein a whole coil is disposed inside and integrally formed with the first region portion.

7. The vibration motor according to claim 1, wherein the bearing portion comprises a second region portion, wherein the second region portion has a protrusion portion protruding radially outward, and
an upper surface of the protrusion portion is in contact with a bottom surface of the housing in the up-down direction.

8. The vibration motor according to claim 1, wherein the first bearing portion comprises:
an air passage, disposed along the one direction; and
an air hole, communicating with the air passage and penetrating through an inner circumferential surface of the first bearing portion extending along one direction.

9. The vibration motor according to claim 8, wherein an opening end of the air hole is aligned with the inner circumferential surface of the first bearing portion extending along the one direction.

* * * * *